US 6,721,495 B1

(12) United States Patent
Kawai et al.

(10) Patent No.: US 6,721,495 B1
(45) Date of Patent: Apr. 13, 2004

(54) INFORMATION GENERATING METHOD AND APPARATUS

(75) Inventors: Sunao Kawai, Toyoake (JP); Norihisa Fujii, Tokoname (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/536,690

(22) Filed: Mar. 28, 2000

(30) Foreign Application Priority Data

Mar. 31, 1999 (JP) .......................................... 11-093631

(51) Int. Cl.$^7$ .............................................. H04N 5/781
(52) U.S. Cl. .......................... 386/126; 386/95; 386/125
(58) Field of Search ............................. 386/45, 46, 95, 386/98, 125, 126; 369/47.35, 275.3

(56) References Cited

U.S. PATENT DOCUMENTS 6,449,228 B2 * 9/2002 Heo .......................... 369/47.35
6,577,812 B1 * 6/2003 Kikuchi et al. ............. 386/105
6,631,241 B2 * 10/2003 Yamauchi et al. ........... 386/95
6,636,474 B1 * 10/2003 Tanaka et al. ............ 369/275.3

FOREIGN PATENT DOCUMENTS

JP   A-10-108135    4/1998
JP   A-10-199215    7/1998

* cited by examiner

*Primary Examiner*—Thai Tran
*Assistant Examiner*—Christopher Onuaku
(74) *Attorney, Agent, or Firm*—Oliff & Berridge, PLC

(57) ABSTRACT

An information generating apparatus of the invention generates disk information by a playback control information generating device based on scenario information input by a scenario information input device and stores the disk information on a storage device. The information generating apparatus also generates video file management information based on information that is found from the scenario information and stores the video file management information on the storage device. On the other hand, video or audio data that are input by a video data input device or an audio data input device are encoded by a video data encoding device or an audio data encoding device and are multiplexed by a multiplexing device. By doing so, a system stream is generated and stored on the storage device. Every one system stream is generated, the rest of the video file management information is generated and stored on the storage device. Then, the disk information, the video file management information, and the system streams are output by an output device in the order according to the format of the multimedia optical disk. Therefore, information that is structured so that it can be recorded on the multimedia optical disk, such as a DVD, can be efficiently generated in a short time.

21 Claims, 19 Drawing Sheets

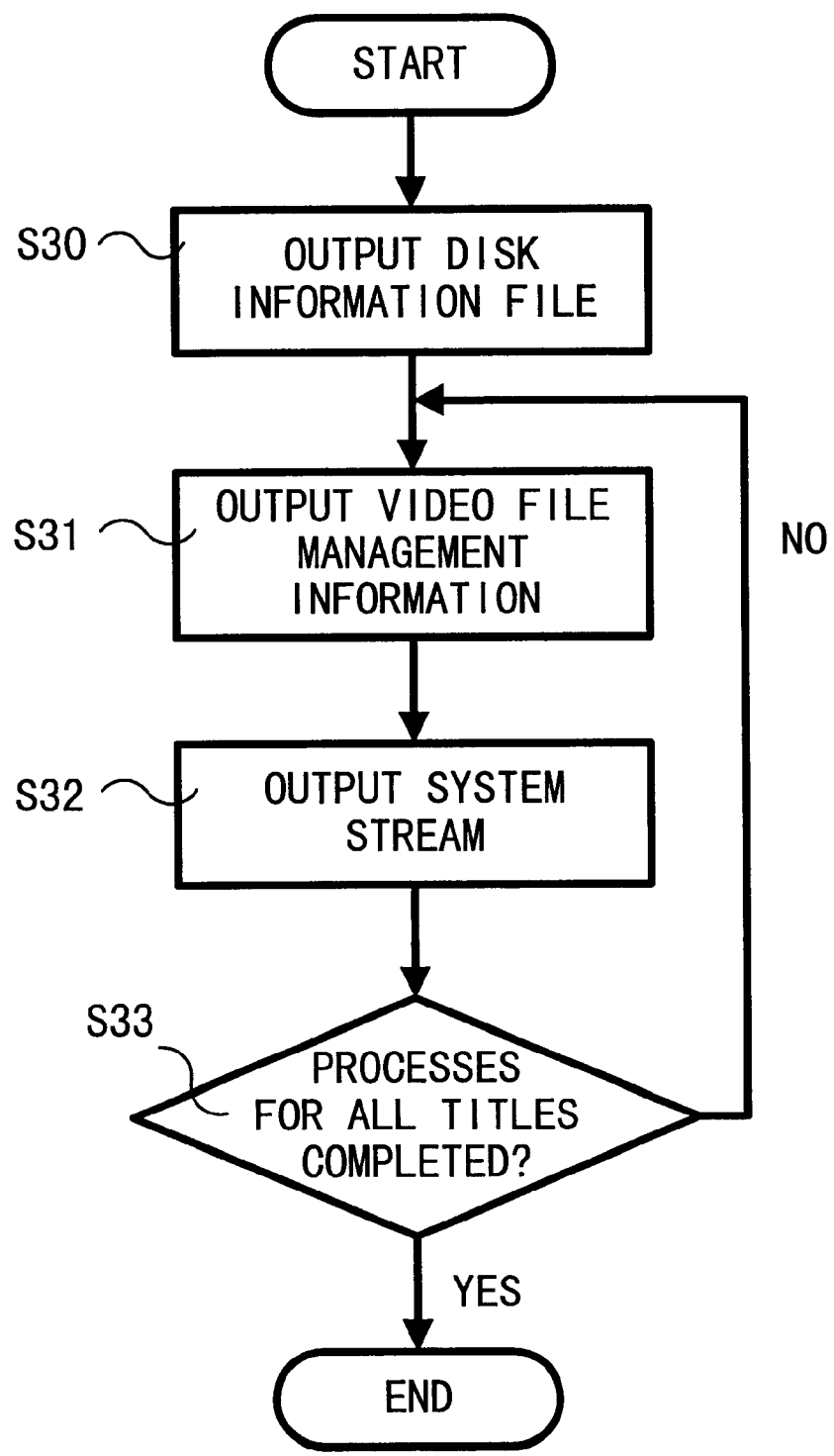

INFORMATION GENERATING METHOD AND APPARATUS

BACKGROUND OF THE INVENTION

1. Field of Invention

The present invention relates to a method and apparatus for generating information for recording moving picture data, audio data, such as voice with the moving picture data or music, and sub-picture data, such as subtitles, on a multimedia optical disk as a system stream, and a method and apparatus for recording generated information on the multimedia optical disk, and an information recording medium storing a program thereof for allowing a computer to execute those methods.

2. Description of Related Art

A conventional recording method of a still picture, moving picture, or sound on a multimedia optical disk, such as a DVD (Digital Versatile Disk (or Disc)) is disclosed in Japanese Laid-Open Patent Application Publication No. 10-199215 and Japanese Laid-Open Patent Application Publication No. 10-108135. In this recording method, first, data of the still picture, moving picture, or sound for recording is encoded in digital based on a method specified in a standard, such as MPEG (Motion Pictures Experts Group). Next, the encoded data is multiplexed according to a logical format specified in a standard of multimedia optical disk, such as the DVD, and a group of data, called a system stream, is generated. Then, system stream management information for managing the system stream is generated according to the logical format. Further, global management information for managing a whole disk, including the system stream management information, according to the logical format. Finally, the system stream, the system stream management information, and the global management information are recorded on the multimedia optical disk.

The multimedia optical disk, such as the DVD, can record an enormous amount of information, so that a plurality of video tapes, for example, which are shot at home, can be brought together in one multimedia optical disk using the above-described recording method. The multimedia optical disk can instantly detect a desirable playback portion by the management information even when an enormous amount of information is recorded thereon. Further, the multimedia optical disk has an outstanding advantage as the recording medium of video and audio.

According to the conventional recording method, the generating order of data to be recorded is the system stream, the system stream management information, and the global management information because the management information includes the information, such as a size of data to be recorded and recording position which are found after an encoding process and a multiplexing process, are completed. However, the order of data specified in the logical format is the global management information, the system stream management information, and then the system stream. Therefore, the data needs to be sorted when the data is recorded on the multimedia optical disk.

As a result, each data described above cannot be generated in the order according to the logical format from the beginning. Therefore, for example, the encoding process and the multiplexing process are performed using different hard disks. Further, on another different hard disk, the system stream, the system stream management information, and the global management information are arranged in the order according to the logical format. Then, the final data is brought to completion. Therefore, the conventional recording method is enormously inefficient and takes a lot of trouble.

SUMMARY OF THE INVENTION

The invention provides a method and an apparatus for generating still picture data, moving picture data, or audio data, such as voice, efficiently and in a short time, as information that is structured so that it can be recorded on a multimedia optical disk, such as a DVD, a method and an apparatus for recording the information on an information recording medium, and an information recording medium storing a program for allowing a computer to execute these methods.

The information generating method may include the steps of inputting scenario information for performing management per title; inputting the substantive data specified by specifying information in structure information of the title included in the scenario information; encoding the input substantive data according to encoding information in the structure information; storing the encoded substantive data in a storage area of the storage device; generating an amount of the substantive data which is encoded to predetermined breakpoints of each step according to encoding and storing or index information about a storing point in the storage area, every breakpoints, and storing the information in the storage area as a part of the substantive data management information; generating information other than the index information of the substantive data management information concurrently with each step based on the structure information and storing the information in the storage area; generating the global management information concurrently with each step based on the scenario information and storing the information in the storage area; and outputting all information in the order according to the format of the information recording medium after all necessary information for the substantive data, the substantive data management information, and the global management information, are stored.

According to the information generating method, first, the scenario information for performing the management per title is input. Next, the specifying information in the structure information included in the scenario information is read and the substantive data specified by the specifying information is input. Then, the encoding information in the structure information is read, and the input substantive data is encoded based on the encoding information. After that, the encoded substantive information is stored in the storage area of the storage device. On the other hand, every predetermined breakpoint of each step according to encoding and recording, the amount of the substantive data which is encoded to the predetermined breakpoints or the index information about the recording point on the recording area is generated, and the information is stored as a part of the substantive data management information. Information other than the index information of the substantive data management information is concurrently generated with each step based on the structure information, and the information is stored in the storage area. Further, the global management information is concurrently generated with each step based on the scenario information, and the information is stored in the storage area. Then, after all necessary information for the substantive data, the substantive data management information, and the global management information are stored, these information are output in the order according to the format of the information recording medium.

As described above, according to the invention, the global management information and the substantive data management information are concurrently generated with the encoding process and the storing process of the substantive data. Further, the index information is generated for every predetermined breakpoint of the encoding and the storing processes and determined as a part of the substantive data management information. That is, the global management information generating process, the substantive data management information generating process, the encoding process, and the storing processes of the substantive data are concurrently performed. Therefore, when the encoding and the storing processes of all substantive data are finished, storing of all necessary information for the substantive data, the substantive data management information, and the global management information, is completed. Then, all of the information is output in the order according to the format of the information recording medium. Therefore, the information that is structured so that it can be recorded on the multimedia optical disk, such as the DVD, can be generated efficiently and in a short time.

According to another aspect of the invention, the step of inputting the scenario information inputs the scenario information including maximum size information of the substantive data of each title, and the step of recording the encoded substantive data in the recording area stores the substantive data whose part that exceeds the maximum size is omitted based on the maximum size information.

According to the information generating method, the scenario information including the maximum size information of the substantive data per title is input as the scenario information. Then, at the time of storing the encoded substantive data in the storage area, the substantive data whose part that exceeds the maximum size is omitted is stored based on the maximum size information. Therefore, according to the invention, the size of the information that the multimedia optical disk, such as the DVD, records is restricted within the recordable size of the multimedia optical disk, so that the appropriate recording of the information is performed.

According to another aspect of the invention, the step of inputting the substantive data inputs a part of the substantive data corresponding to time break information that is the specifying information, and the steps according to encoding and storing the substantive data encodes and stores a part of the substantive data corresponding to the time break information.

According to the information generating method, when inputting the substantive information, the time break information is read as the specifying information, and the part of the substantive data corresponding to the time break information is input. When encoding and storing the substantive data, the part of the substantive data corresponding to the time break information is encoded and stored. Therefore, a desirable information is appropriately recorded on the multimedia optical disk, such as the DVD.

In a preferred aspect of the invention, an information recording method of recording the information may further include the steps of converting the information output by the step of outputting to a form according to the format of the information recording medium; and modulating a light beam based on the information which is converted to the form by the step of converting and recording the information on the information recording medium.

According to the information recording method, as information that is structured so that it can be recorded on a multimedia optical disk, such as a DVD, is generated efficiently and in a short time, and next the information is converted to the form according to the format of the information recording medium. Next, a light beam is modulated based on the information which is converted to the format, and the information is recorded on the multimedia optical disk. Therefore, the recording of the information on the information recording medium is performed efficiently and in a short time.

In another aspect of the invention, an information generating method of generating substantive data representing one of video data or audio data, substantive data management information for managing the substantive data according to a format of an information recording medium per title or a plurality of titles, and global management information for managing the whole information recording medium on a storage medium other than the information recording medium may include the steps of inputting scenario information for performing management per title; allocating storage areas of each information in the order according to the format of the information recording medium so that sizes of the substantive data management information and the global management information are maximum on the storage device, based on structure information of the title in the scenario information; calculating an amount of information per unit time at the time of playing by dividing a result of subtraction that the size of the storage area after allocation is subtracted from a total size of storage area of the information recording medium by a total playback time length of the substantive data of each title which is obtained from the structure information; allocating a recording area of the substantive data after encoding per title in the order according to the format of the information recording medium, based on a maximum amount of the information by calculating the maximum amount of the information of the substantive data after encoding per title by multiplying the amount of the information per unit time by the playback time length of each title; inputting the substantive data specified by specifying information in the structure information; encoding the input substantive data based on encoding information in the structure information; storing the encoded substantive data in the storage area; generating an amount of the substantive data which is encoded to predetermined breakpoints of each step according to encoding and storing or index information about a storing point in the storage area, every breakpoint, and storing the information in the storage area as a part of the substantive data management information; generating information other than the index information of the substantive management information concurrently with each step based on the structure information and storing the information in the storage area; generating the global management information concurrently with each step based on the scenario information and storing the information in the storage area; and outputting all information from top of the storage area after all necessary information for the substantive data, the substantive data management information, and the global management information, are stored.

According to the information generating method, the scenario information for performing the management per title is input. Next, the structure information of the title included in the scenario information is read, and the storage areas of each information are allocated in the order according to the format of the information recording medium so that sizes of the substantive data management information and the global management information are maximum on the storage device, based on structure information of the title in the scenario information. Then, the amount of information per unit time at the time of playing calculating is calculated by dividing the result of subtraction that the size of the storage area after allocation is subtracted from the total size of storage area of the information recording medium by the total playback time length of the substantive data of each title which is obtained from the structure information. The maximum amount of the information of the substantive data after encoding per title is calculated by multiplying the amount of the information per unit time by the playback time length of each title, and the storage area of the substantive data after encoding per title is allocated in the order according to the format of the information recording medium based on the maximum amount of the information. Next, the substantive data specified by specifying information in the structure information, is input. Then, the encoding information included in the structure information of the title is read, and the input substantive data is encoded based on the encoding information. The encoded substantive data is stored in the storage area. On the other hand, every predetermined breakpoint of each step according to encoding and storing, the amount of the information of the substantive data which is encoded to the predetermined breakpoints or the index information about the storing point on the storage area is generated, and the information is recorded as a part of the substantive data management information. Information other than the index information of the substantive data management information is concurrently generated with each step based on the structure information, and the information is stored in the storage area. Further, the global management information is concurrently generated with each step based on the scenario information, and the information is stored in the storage area. Then, after all necessary information for the substantive data, the substantive data management information, and the global management information are stored, the information is then output from top of the storage area.

As described above, according to the invention, the global management information and the substantive data management information are concurrently generated with the encoding process and the storing process of the substantive data. Further, the index information is generated for every predetermined breakpoint of the encoding process and the storing process and determined as a part of the substantive data management information. That is, the global management information generating process, the substantive data management information generating process, and the encoding process and the storing process of the substantive data are concurrently performed. Therefore, when the encoding process and the storing process of all substantive data are finished, storing of all necessary information for the substantive data, the substantive data management information, and the global management information, is completed. Further, this information is stored in the maximum sized storage area that is allocated in the order according to the format of the information recording medium, so that the information that is structured so that it can be recorded on the multimedia optical disk, such as the DVD, is brought to completion when the storing is completed. Therefore, the information that is structured so that it can be recorded on a multimedia optical disk, such as a DVD, can be efficiently generated in a short time.

According to another aspect of the invention, the step of inputting the substantive data inputs a part of the substantive data corresponding to time break information that is the specifying information, and the steps according to encoding and recording the substantive data encodes and stores a part of the substantive data corresponding to the time break information.

According to the information generating method, when inputting the substantive information, the time break information is read as the specifying information, and the part of the substantive data corresponding to the time break information is input. When encoding and storing the substantive data, the part of the substantive data corresponding to the time break information is encoded and recorded. Therefore, desirable information is appropriately recorded on the multimedia optical disk, such as the DVD.

BRIEF DESCRIPTION OF THE DRAWINGS

A preferred embodiment of the present invention will be described in detail with reference to the following figures wherein:

FIG. 8 is a flowchart showing an disk image output process of flowchart of FIG. 5;

DETAILED DESCRIPTION OF PREFERRED EMBODIMENTS

Figure 1:
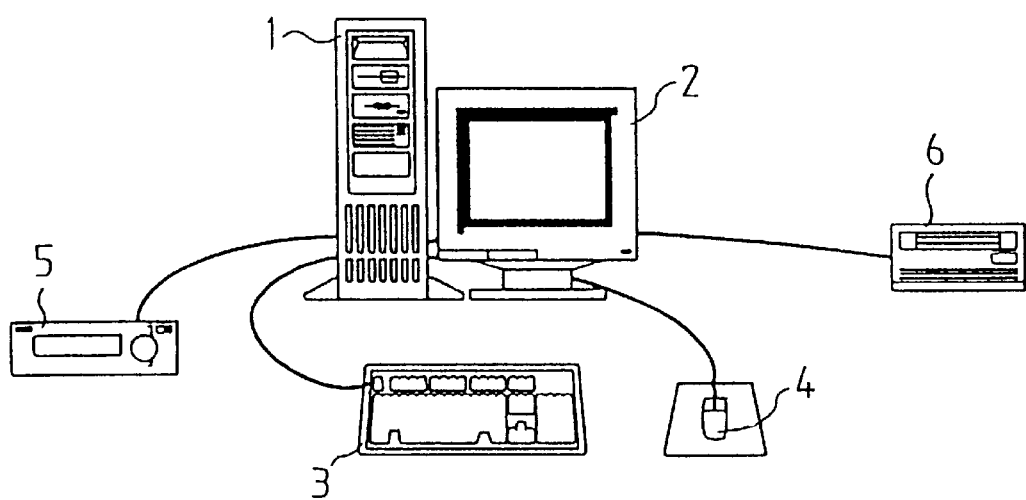
FIG. 1 is a front view of an information generating apparatus of a first embodiment of the invention.

Embodiments of the invention will be described with reference to the accompanying drawings.

First, a first embodiment of the invention will be described with reference to FIGS. 1 to 9 and 12 to 18. In the embodiment, the invention is applied to an information generating apparatus that makes contents for a multimedia optical disk, such as a DVD (Digital Versatile Disk (or Disc)), using video data or audio data recorded on a videotape as a source material. Processes performed in the information generating apparatus of the embodiment are constructed of a process of inputting scenario information for specifying an overview and a structure of content, a process of generating management information according to a logical format specified in a standard of a multimedia optical disk, for playing the video or audio data according to the scenario information, a process of encoding and multiplexing the video or audio data to form that conforms to the standard of the multimedia optical disk, a process of outputting the multiplexed video or audio data to a hard disk in the order according to the logical format and a process of generating a disk image.

Hereinafter, a structure of the information generating apparatus and each process of the embodiment will be described. First, before describing the structure and processes, a logical format for the multimedia optical disk, such as the DVD, will be described. In the description hereinafter, audiovisual data (hereinafter referred to as "AV data") generally includes both video and audio data. There are cases where only the video data exists and both video and audio data exist in the AV data.

First, a management unit of the content, such as a movie, recorded on the multimedia optical disk will be described. In the embodiment, the unit of content to be recorded on the multimedia optical disk is designated as a title. For example, when the content is a movie, one movie is assigned to one title. Therefore, a multimedia optical disk capable of recording three titles can record three movies.

A title set is constructed of a plurality of titles sharing the AV data with each other. For example, when there are three versions, an uncut version, a theater version, and a TV version, that share a plurality of AV data each other, for the same movie, they are collectively called one title set.

The multimedia optical disk of the embodiment can record a plurality of title sets. For example, when recording the theater version and the uncut version of movie A, movie B, and movie C, three title sets constructed of two titles each are recorded on the multimedia optical disk.

Each title is constructed of scenes and playback route information of scenes. The scene includes the AV data, that is, the video and audio data. In this specification, the audio data not only includes human voice but also sound other than voice, or sound data, such as music, and the like.

The playback route information of scenes includes a playback route information having branches. In the embodiment, the playback route information having no branches for continuous playback is designated as a program chain (PGC) information. The PGC information are continuously sequenced and constructs the playback route information of the title set altogether.

Next, the logical format of the multimedia optical disk will be described. FIGS. 12 to 18 show only necessary information for embodying the invention, so that irrelevant portions are omitted from the illustrations.

Figure 12:
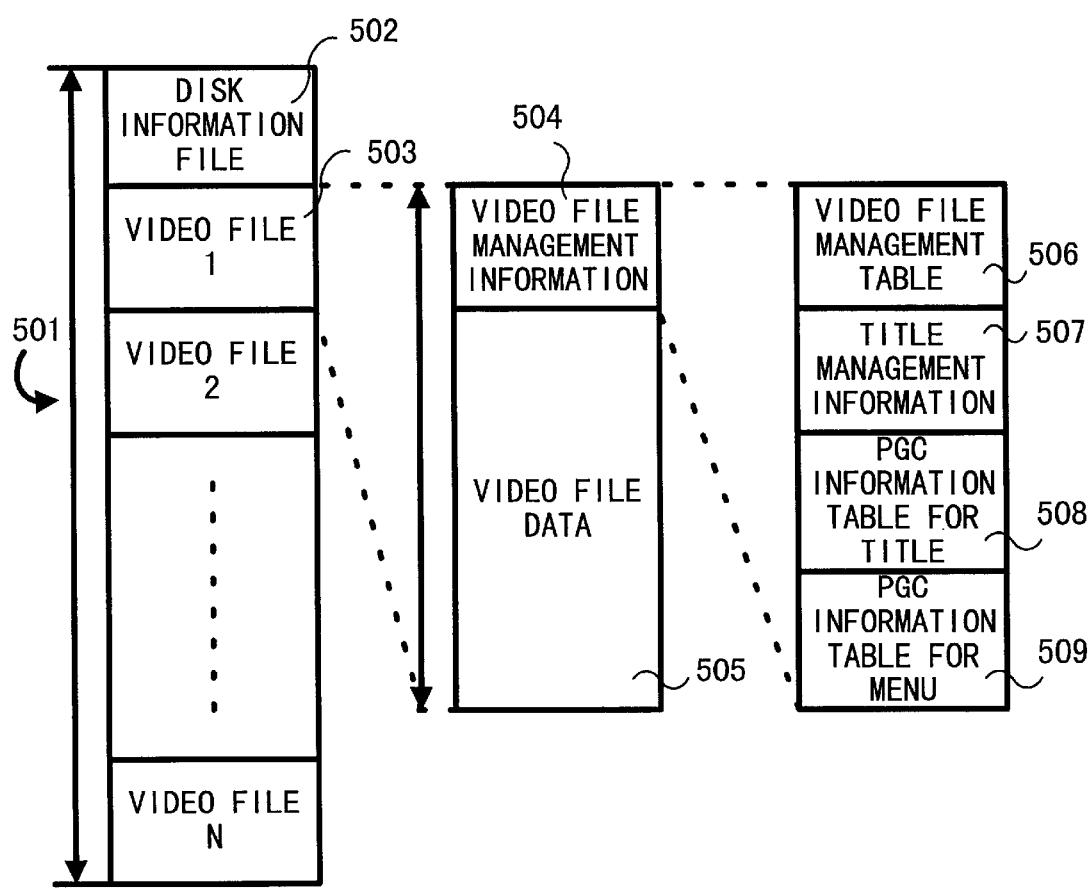
FIG. 12 is a logical format for a multimedia optical disk.

FIG. 12 shows a data structure of recording information to be recorded on the multimedia optical disk that is an information recording medium. Recording information 501 is constructed of a disk information file 502 that is global management information and a plurality of video files 503.

The disk information file 502 includes volume information that is global information of the multimedia optical disk. Further, the disk information file 502 includes menu management information for selecting a title set by a user when starting playing the multimedia optical disk.

The video file 503 includes individual title sets. The video file 503 is constructed of video file management information 504 that is substantive data management information, and video file data 505 that is the substantive data. The video file data 505 includes AV data of all scenes constructing the title set and sub-picture data. The video file management information 504 is constructed of a video file management table 506, title management information 507, a PGC information table for title 508, and a PGC information table for menu 509. The video file management table 506 includes header information for the video file 503. The title management information 507 includes the information for managing a plurality of titles constructing the title set. The PGC information table for title 508 includes the information for defining all PGC information of titles in the title set. The PGC information table for menu 509 includes the information for defining all PGC information of the menu in the title set.

Figure 13:
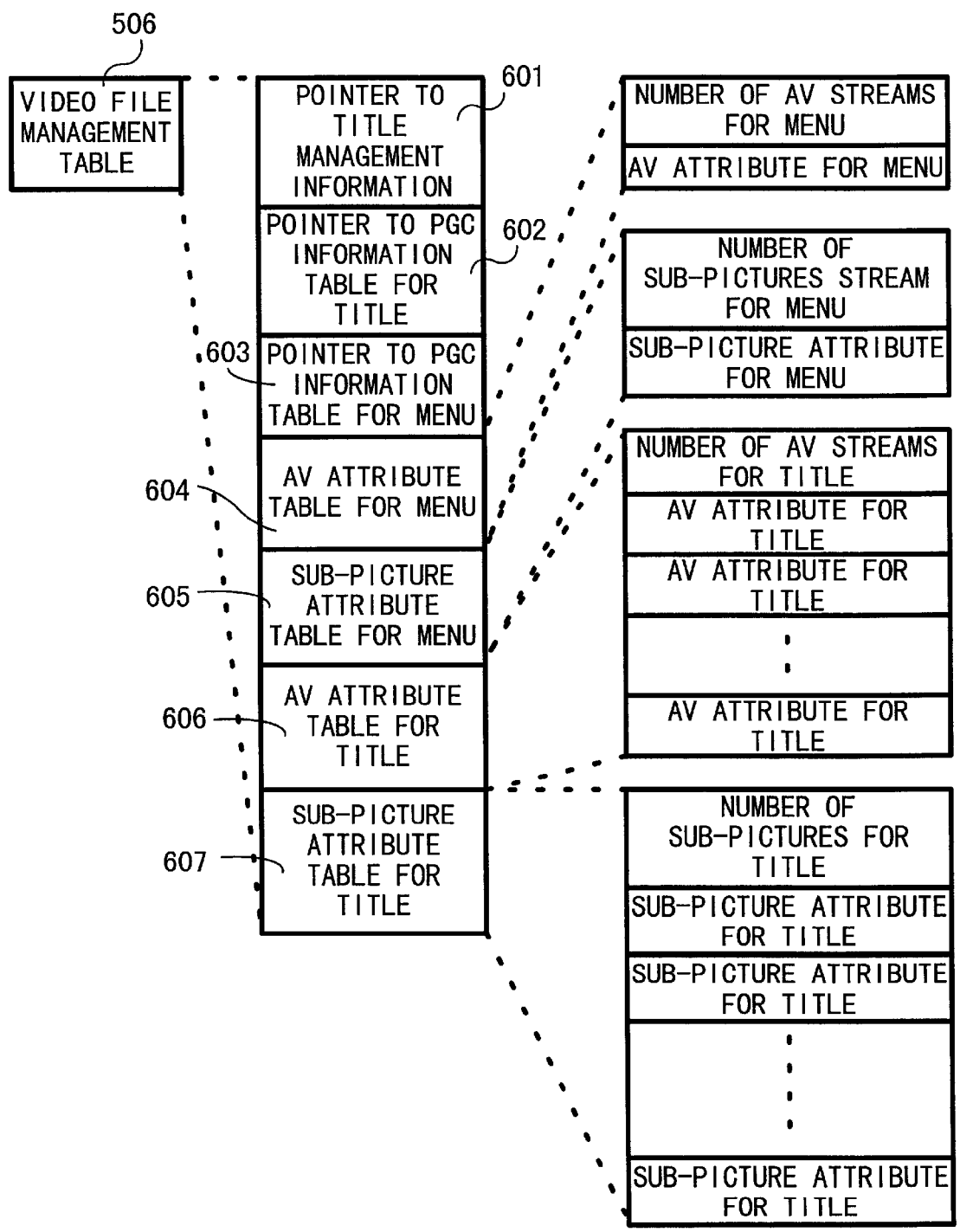
FIG. 13 is a diagram showing a video file management table of the logical format of FIG. 12 in detail.

FIG. 13 shows a structure of the video file management table 506. The video file management table 506 is constructed of a pointer 601 to the title management information 507, a pointer 602 to the PGC information table for title 508, a pointer 603 to the PGC information table for menu 509, an AV attribute table for menu 604, a sub-picture attribute table for menu 605, an AV attribute table for title 606, and a sub picture table for title 607.

The AV attribute table for menu 604 includes a number of the video streams or audio streams to be used in the menu, and an attribute of the video or audio stream. The sub-picture attribute table for menu 605 includes a number of the sub-picture streams to be used in the menu and an attribute of the sub-picture stream. The AV attribute table for title 606 includes a number of the video streams or audio streams to be used in the title, and an attribute of the video or audio stream. The sub-picture attribute table for title 607 includes a number of the sub-picture streams to be used in the title and an attribute of the sub-picture stream.

Information about the number and the attribute of each stream can be set in advance before generating the video file data 505. Sizes of recording areas for the information about the number of the streams and the attribute are predetermined. Therefore, when the number of the streams is found, the sizes of the recording areas for each table 604 to 607 can be calculated. Further, sizes of recording areas for each pointer 601 to 603 are also predetermined. Therefore, when the number of the streams is found, the size of the recording area for one title of the whole video file management table 506. When the size of the recording area of the whole video file management table 506 is found, as shown in FIG. 12, the top position of the recording area of the title management information 507 is found, so that the contents of the pointer 601 to the title management information shown in FIG. 13 can be determined.

Figure 14:
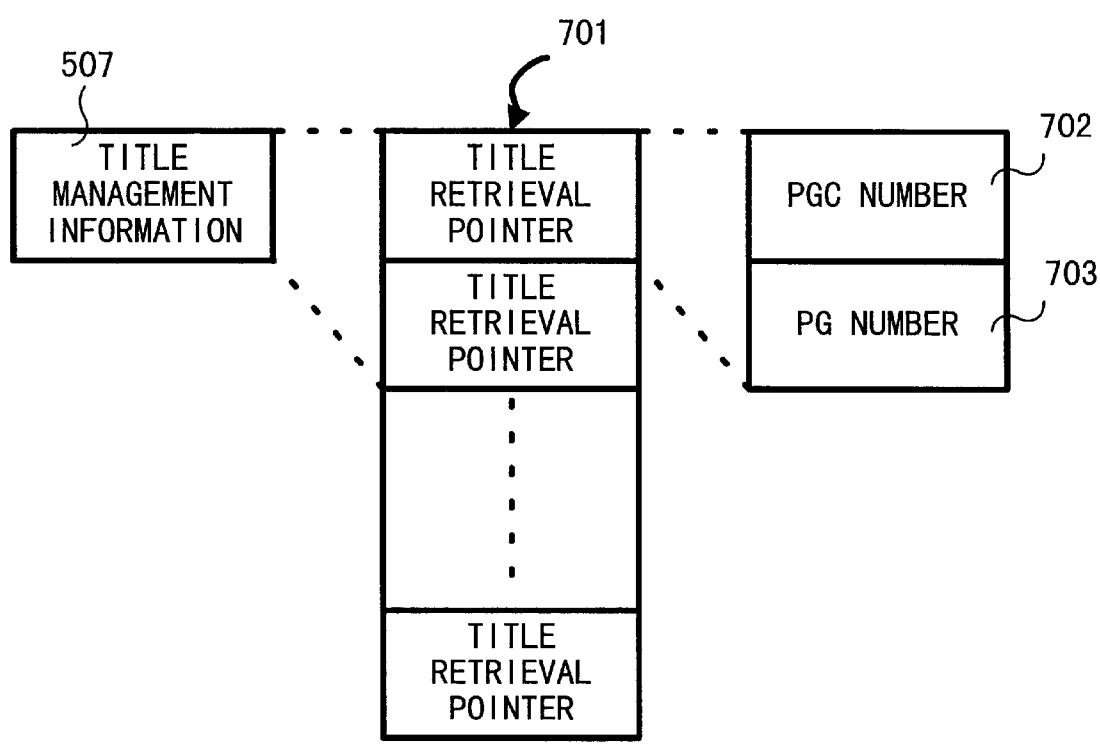
FIG. 14 is a diagram showing title management information of the logical format of FIG. 12 in detail.

FIG. 14 shows a structure of the title management information 507. The title management information 507 is a table of a title retrieval pointer 701 for speedily retrieving a title included in the video file data 505. The title retrieval pointer 701 includes a PCG number 702 that is a number of a PGC information, and a program (PG) number 703 that is a number of the PG constructing the PGC.

A number of the title search pointers 701 is determined based on a number of the chapters (described hereinafter).

The number of the chapters can be set in advance before generating the video file data 505. Further, it is possible to set in advance which number of the PGC is assigned to which title or how many PGCs are assigned to each title. Furthermore, it is possible to set in advance which number of the PG is assigned to which chapter or how many PGs are assigned to each title. Sizes of recording area of the PGC number 702 and the PC number 703 are predetermined. Therefore, when the number of the chapters, the number of PGCs of the title, and the number of the PGs of the title are found, the size of the recording area of the whole title management information 507 can be calculated. As a result, the top position of the recording area of the PGC information table for title 508 shown in FIG. 12 is found, so that the contents of the pointer 602 to the PGC information table for title shown in FIG. 13 can be determined.

Figure 15:
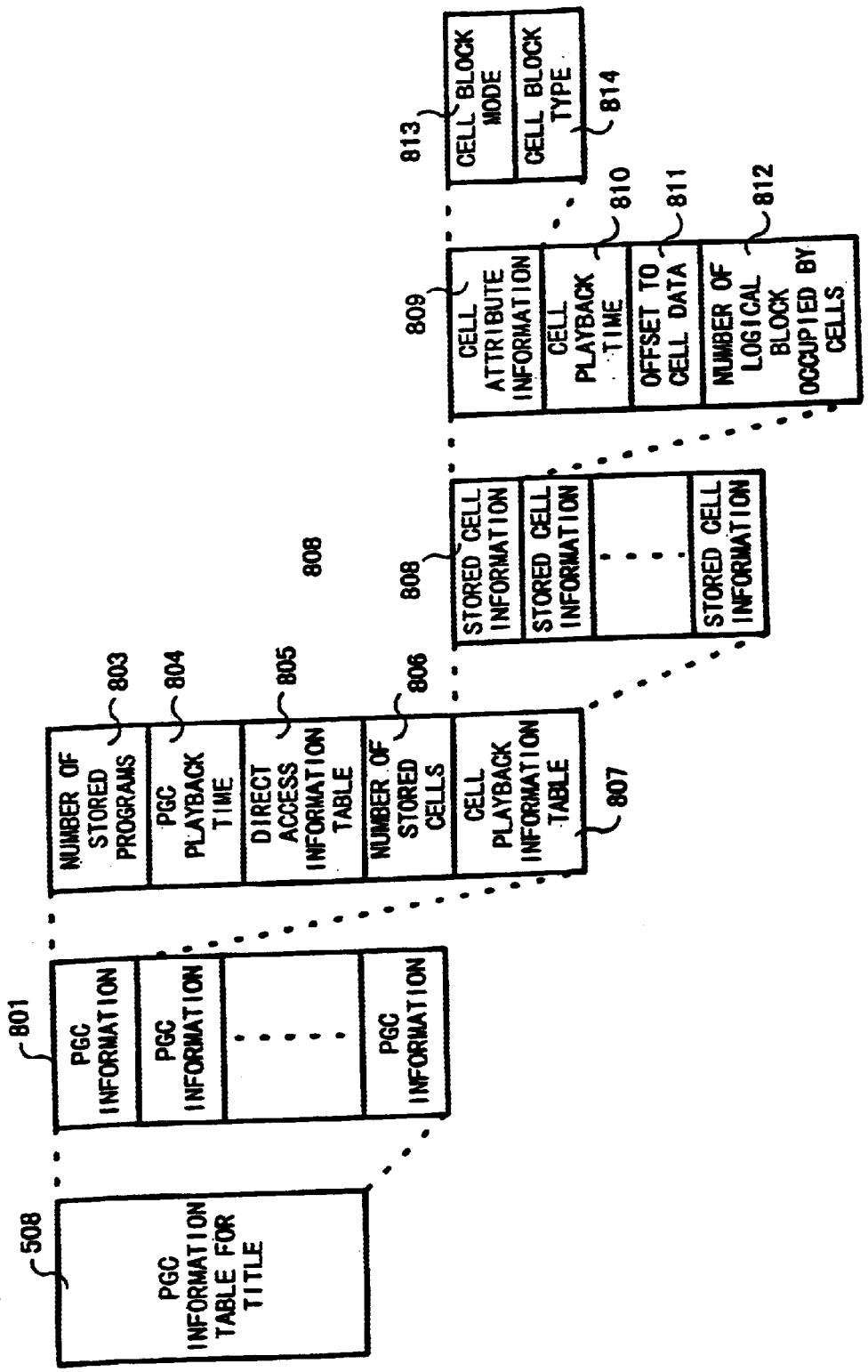
FIG. 15 is a diagram showing a program chain information table for title of the logical format of FIG. 12 in detail.

FIG. 15 shows a structure of data of the PGC information table for title 508. The PGC information table 508 is constructed of a plurality of entries each defining all PGC in the title set. Each PGC information 801 has a number of stored programs 803, a PCG playback time 804, a direct access information table 805, a number of the stored cells 806, and a cell playback information table 807.

The number of the stored programs 803 includes the information about the number of the programs managed by a piece of the PCG information 801. Further, the PCG playback time 804 includes the information about the time involved in playback of a piece of the PGC information 801. The direct access information table 805 includes a first cell number of the program. The number of the stored cells 806 includes the number of the programs of information about the number of the cells constructing one program. The encoding process, multiplexing process, and recording process are performed cell by cell which is an unit of these processes.

Of the information in the PGC information table for title 508, the information except a cell playback information table 807 described below, can be predetermined before the video file data 505 is generated. Further, sizes of recording areas for each information are predetermined.

The cell playback information table 807 is constructed of one or more entries of the stored cell information 808. The number of the programs of the stored cell information 808 is provided. Further, the stored cell information 808 in the cell playback information table 807 are listed in the cell playback order.

Further, the stored cell information 808 includes cell attribute information 809, a cell playback time 810, an offset 811 showing a recording point of cell data to be stored in the video file data 505 on the optical disk, and a number of logical blocks 812, with respect to the cell that should be played back, with respect to each cell constructing the programs.

The cell attribute information 809 includes a cell block mode 813 and a cell block type 814. The cell block mode 813 includes the information about whether the cell constructs a multi angle block and if it constructs the multi angle block, whether the cell is the first or last one, or other. The cell block type 814 includes the information about whether the cell is in a multi angle block.

Of this information, the cell playback time 810 and the number of the logical blocks 812 shows the amount of information of the video or audio data after the encoding process, the multiplexing process, and the recording process described below are completed. Further, the offset 811 is index information for accessing the cell.

That is, the cell playback time 810, the offset 811 to the cell data, and the number of the logical blocks 812 occupied by the cell cannot be found until the video file data 505 is actually generated. However, other information can be predetermined before the video file data 505 is generated. Further, sizes of recording areas for each information are predetermined. Therefore, when the number of the PGC information of the title, the number of the PGs in each PGC information 801, and the number of the cells in the PG are found, the size of the recording area of the whole PGC information table for title 508 can be calculated. When the size of the recording area whole PGC information table for title 508 is found, the top position of the recording area of the PGC information table for menu 509 shown in FIG. 12 is found, so that the contents of the pointer 603 to the PGC information table for menu shown in FIG. 13 can be determined.

Figure 16:
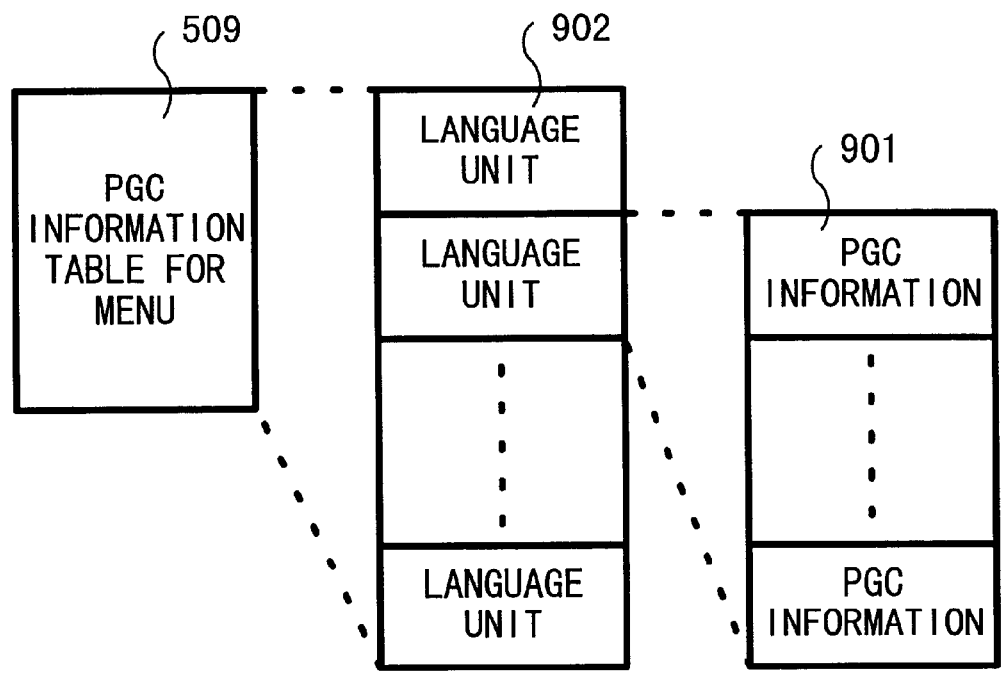
FIG. 16 is a diagram showing a program chain information table for menu of the logical format of FIG. 12 in detail.

FIG. 16 shows a structure of data of the PGC information table for menu. The multimedia optical disk often has a menu supporting a plurality of languages. Therefore, the PGC information 901 for each language are stored in the PGC information table for menu 509 as a menu language unit 902. The PGC information 901 is the same in structure as the PGC information for title 801 included in the PGC information table for title 508 shown in FIG. 24. These information can be predetermined before the video file data 505 is generated.

Figure 17:
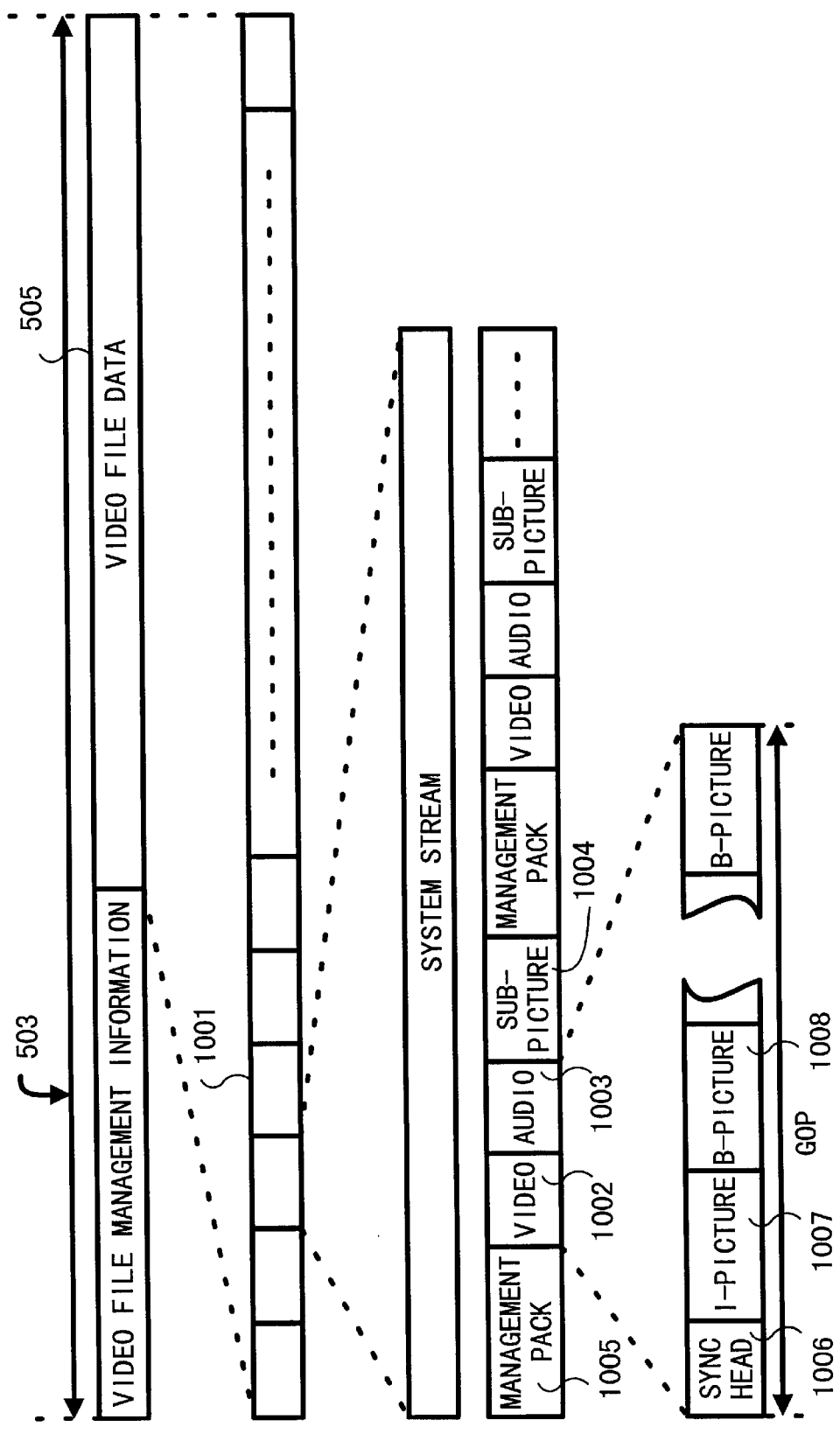
FIG. 17 is a diagram showing a video file data of the logical format of FIG. 12 in detail.

FIG. 17 shows a structure of the video file data 505. The video file data 505 is constructed of a plurality of system streams. The pack length of the system stream is 2 KB, which is determined as a pack. Management information (management pack) 1005, moving picture information (video) 1002, audio information (audio) 1003, a sub-picture 1004 are repeatedly stored in the system stream in this order. The moving picture information 1005 consists of GOP (Group Of Pictures) that is a compression/decompression unit of moving picture data compression among frames. The GOP unit is a minimum picture unit, which can be independently played back. The management pack 1005 is interleaved as a management pack before the GOP. The management pack 1005 is search information for accessing GOP, and the information for menu information called high light information is also stored in the management pack 1005. The GOP of the moving picture information 1002 consists of 12 to 15 frame pictures and is constructed of a sync head 1006, an I-picture (Intra-coded picture) 1007, and a plurality of B-picture (Bidirectionally predictive-coded picture) 1008.

Figure 18:
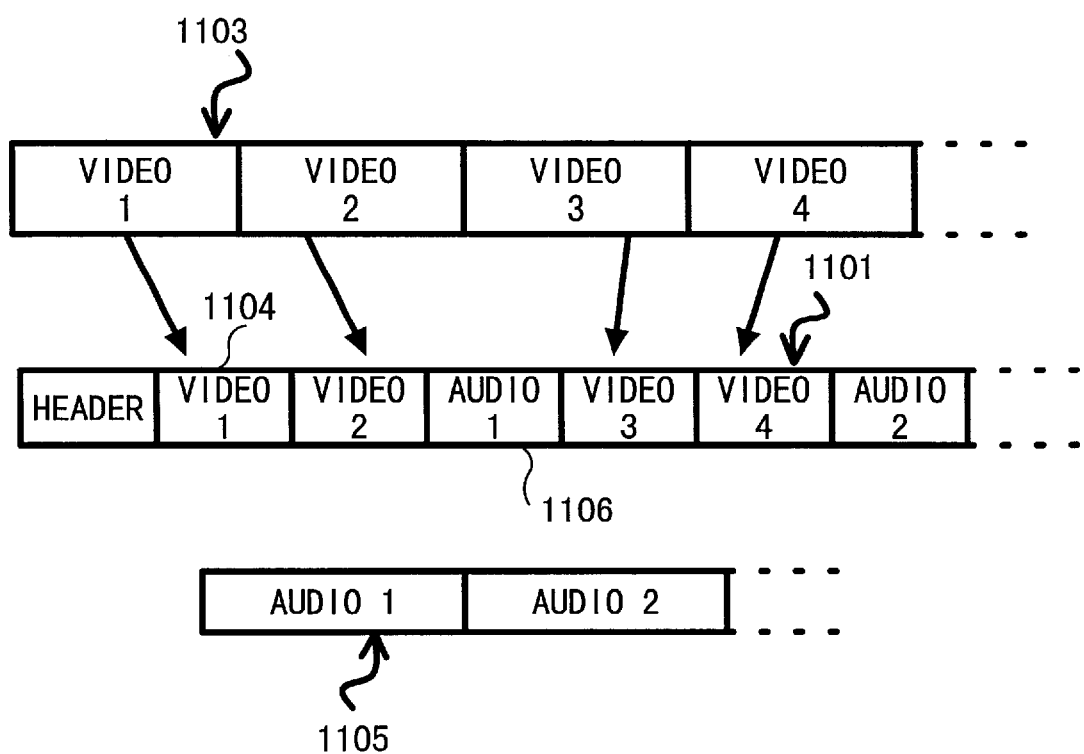
FIG. 18 is a diagram showing a system stream of the logical format of FIG. 12 in detail.

FIG. 18 is an explanatory diagram of the system stream. The system stream 1101 is constructed by interleaving a header 1102, which is management information, a video data (video) 1104, which is included in a video data string 1103, and audio data (audio) 1106, which is included in an audio data string 1105. The system stream in FIG. 18 is constructed of such that the video data string 1103 and the audio data string 1105 are interleaved thereon. However, there is a case where the audio data 1106 is not included in the system stream.

The logical format of the recording information 501 to be recorded on the multimedia optical disk, which is the object to be processed by the information generating apparatus of the embodiment Next, a general structure of information generating apparatus of the embodiment will be described with reference to FIGS. 1 and 2.

As shown in FIG. 1, the information generating apparatus of the embodiment includes a main unit of the information generating apparatus 1 such as a personal computer; a display 2, which is a displaying device, such as CRT; a keyboard 3 and a mouse 4, which are an input device; a video cassette recorder 5 (hereinafter referred to as VCR), which is an information playback apparatus, for playing a video tape; and an optical disk recording apparatus 6, which is a recording device, for recording information on the multimedia optical disk such as the DVD.

Figure 2:
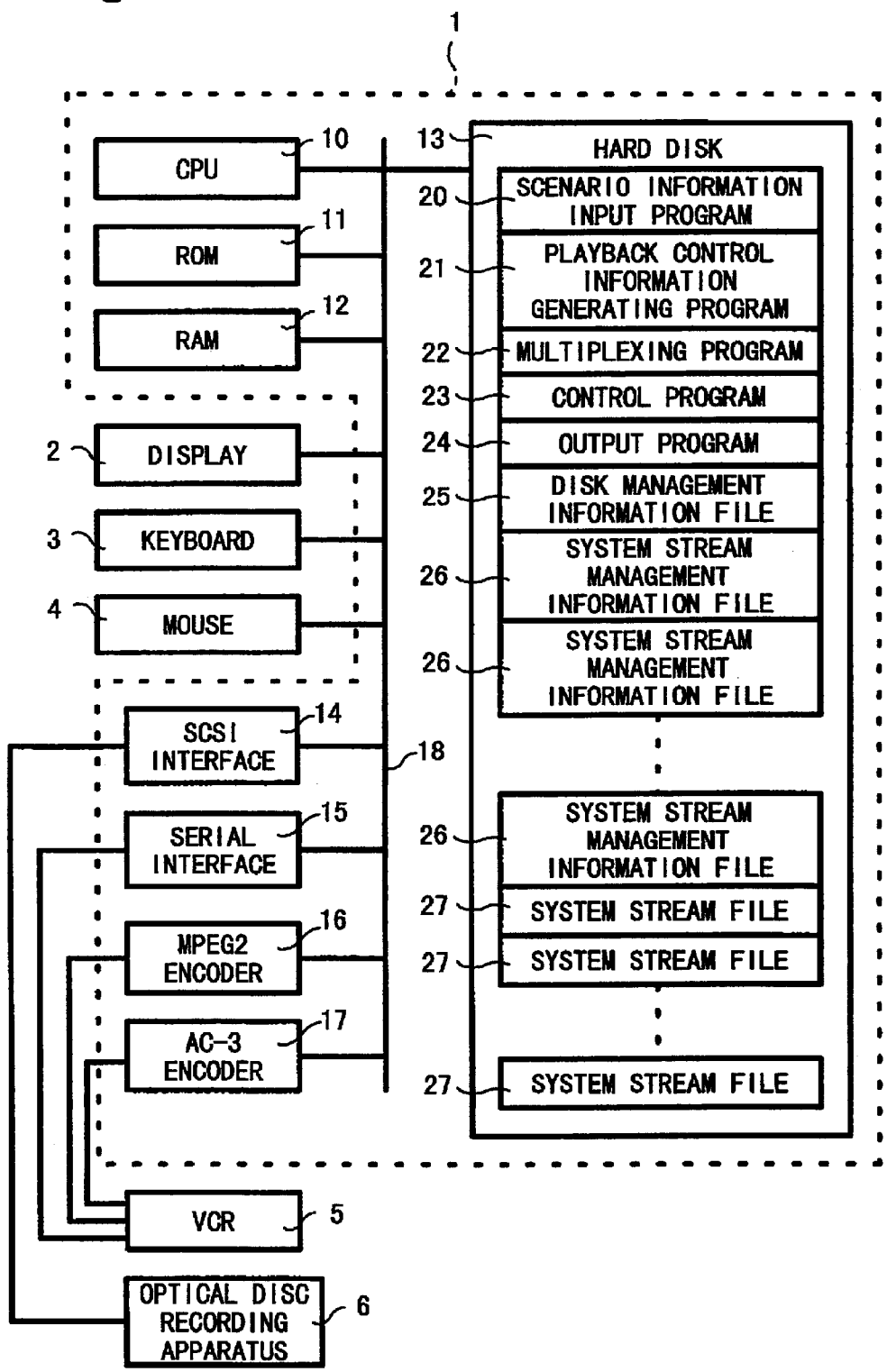
FIG. 2 is a block diagram showing a general structure of the information generating apparatus of FIG. 1.

As shown in FIG. 2, which is a block diagram showing the structure of the information generating apparatus of the embodiment, the main unit 1 comprises a CPU 10; a ROM 11, on which a BIOS program and other programs are stored; a RAM 12, which temporary stores data; a hard disk 13, which stores disk image data and various programs for implementing each above-described process in the information generating apparatus, as a storage device; SCSI interface 14, which is an interface to the optical disk recording apparatus 6; a serial interface 15, which is an interface to the VCR 5; an MPEG2 encoder 16 for encoding the AV data; and an AC-3 encoder 17 for encoding the audio data. In FIG. 2, aforementioned elements of the main unit 1 are enclosed with a dashed line. Each elements described above, the display 2, the keyboard 3, and the mouse 4 are connected each other via a Bus 18.

The main unit 1 includes a general computer equipment, such as the aforementioned personal computer. However, in FIG. 2, of elements of general computer equipment, the elements, for which explanations are unnecessary for the embodiment, are omitted from the illustration.

For example, there is a floppy disk drive or a CD-ROM drive other than the elements shown in FIG. 2. Programs for each process in the information generating apparatus of the embodiment are stored on the CD-ROM, for example, which is an information recording medium. The programs can become a state in which they can be run by installing them on the hard disk 13 using the CD-ROM drive. In FIG. 2, it has been shown that a scenario information input program 20, a playback control information generating program 21, multiplexing program 22, a substantive data generating program 23, an output program 24, and a control program 25 are installed on the hard disk 13.

The hard disk 13 is used as a storage device for storing information to be recorded on the multimedia optical disk such as the DVD. In FIG. 2, it has been shown that a disk information file 25, a system stream management information file 26, and a system stream file 27 are stored on the hard disk 13.

Detailed explanations about the CPU 10, the ROM 11, the RAM 12, the display 2, the keyboard 3, and the mouse 4 are omitted since they are similar in structure to those used for the general computer equipment.

In the main unit 1 of the embodiment, there are an MPEG2 encoder 16 and an AC-3 encoder 17, which the general computer equipment does not include thereon.

The MPEG2 encoder 16 is a device for compressing and encoding video data according to the MPEG2 standard. The AC-3 encoder 17 is a device for compressing and encoding audio data according to the AC-3 standard. These encoders are equipped as add-on boards which can be attached to the Bus 18 in the main unit 1. These encoders each have a video interface for connecting with the VCR 5, and an audio interface for connecting with the optical disk recording apparatus 6.

FIG. 1 shows an example that one VCR 5 is connected to the main unit 1. However, it would be understood that the invention is not restricted to the particular forms shown in the embodiment. A plurality of VCRs 5 can be connected to the main unit 1. A selection of VCR 5, access to a specific point of a video tape in the selected VCR 5, or playing and stopping the video tape is implemented by outputting control signals to the VCR 5 via the serial interface 15. The control signals are output by the execution of a control program installed on the hard disk 13, by the CPU 10.

For example, the optical disk recording apparatus 6 that records data on a DVD-R (DVD-Recordable) is used. That is, in the embodiment, the DVD-R, which can record information once, is used as the multimedia optical disk. However, it would be understood that the invention is not restricted to the particular forms shown in the embodiment. For example, data may be temporary recorded on a digital linear tape using a digital tape recording apparatus instead of the optical disk recording apparatus 6. Then, the data may be transferred to and recorded on the multimedia optical disk by undergoing a pressing operation or the like using the digital linear tape.

Next, a process of making an information recording medium using the information generating apparatus of the embodiment will be described with reference to FIGS. 3 to 9.

Figure 3:
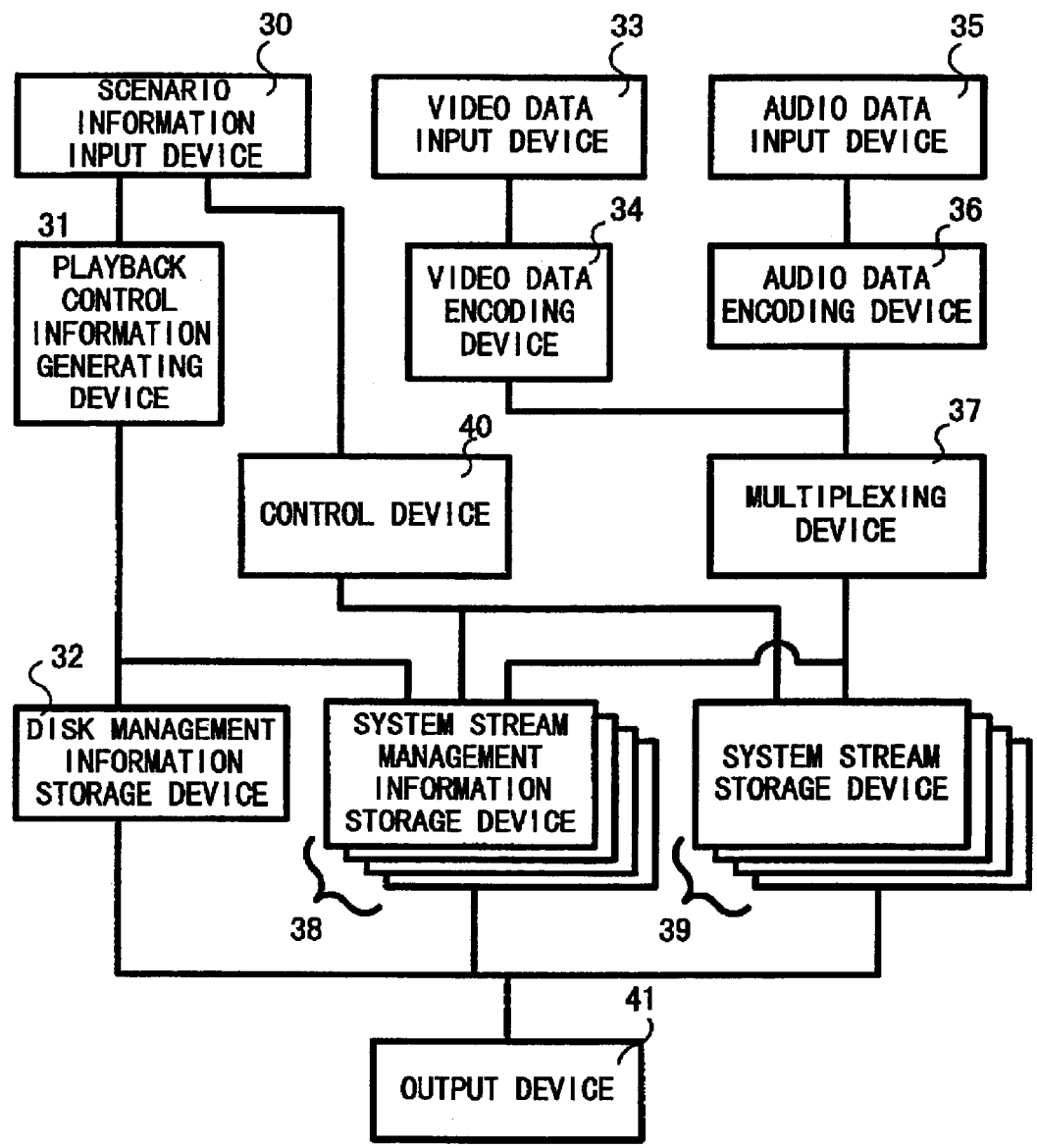
FIG. 3 is a block diagram showing functions of the information generating apparatus of FIG. 1.
Figure 5:
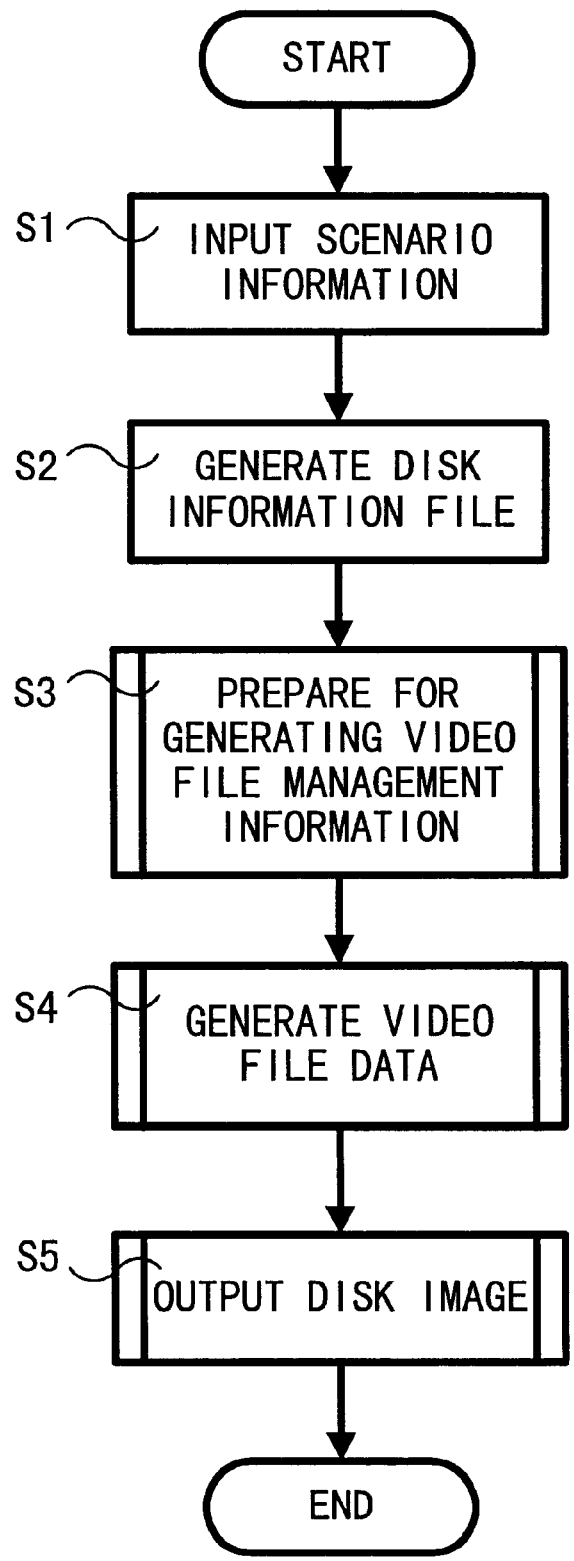
FIG. 5 is a flowchart showing an information generating process to be executed in the information generating apparatus of FIG. 1.
Figure 6:
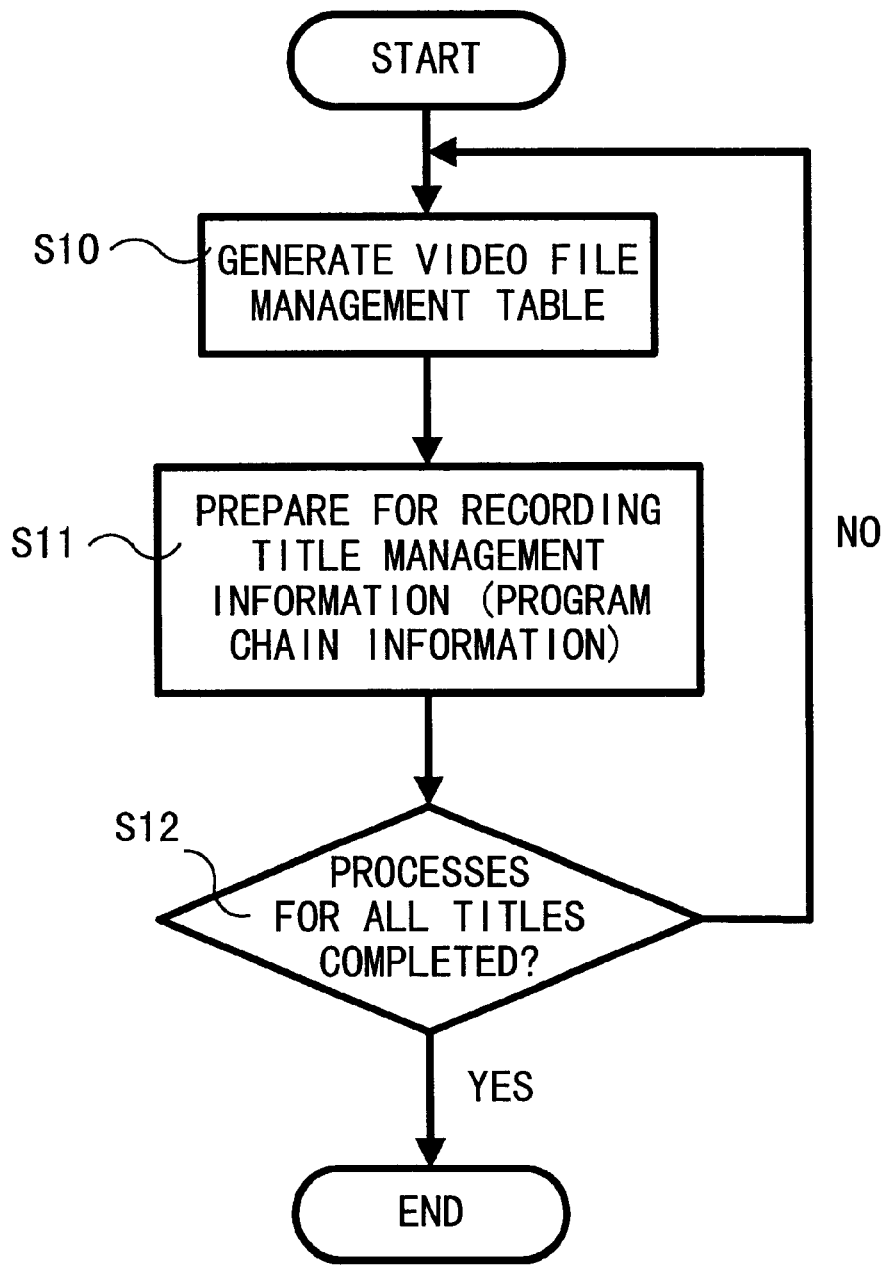
FIG. 6 is a flowchart showing a preparation process for generating video file management information of the flowchart of FIG. 5 in detail.

FIG. 3 is a block diagram of functions of the aforementioned information generating apparatus. FIG. 5 is a flowchart showing a information generating process performed in the information generating apparatus.

Hereinafter, the information generating process performed in the information generating apparatus of the embodiment will be described step by step shown in FIG. 5. In a video file data generating process at S4 (hereinafter, S stands for a step), the generating process of the video file data 505 and the generating process of the video file management information 504 are concurrently performed. In the flowchart of FIG. 5, the generating process of the video file data is performed at S3 and S4.

A scenario information is the information for instructing a structure of the contents to be recorded on the multimedia optical disk. The scenario information is input by a scenario information input device 30 shown in FIG. 3. The scenario information input device 30 functions by the execution of a scenario information input program 20 installed on the hard disk 13, by the CPU 10. First, the CPU 10 runs the scenario information input program 20 so that an entry form is displayed on the display 2. When an operator inputs the necessary information to the entry form using the keyboard 3 or the mouse 4, the CPU 10 reads the input information and stores them in the RAM 12 or the hard disk 13, and then generates scenario information 400, as shown in FIG. 4.

Figure 4:
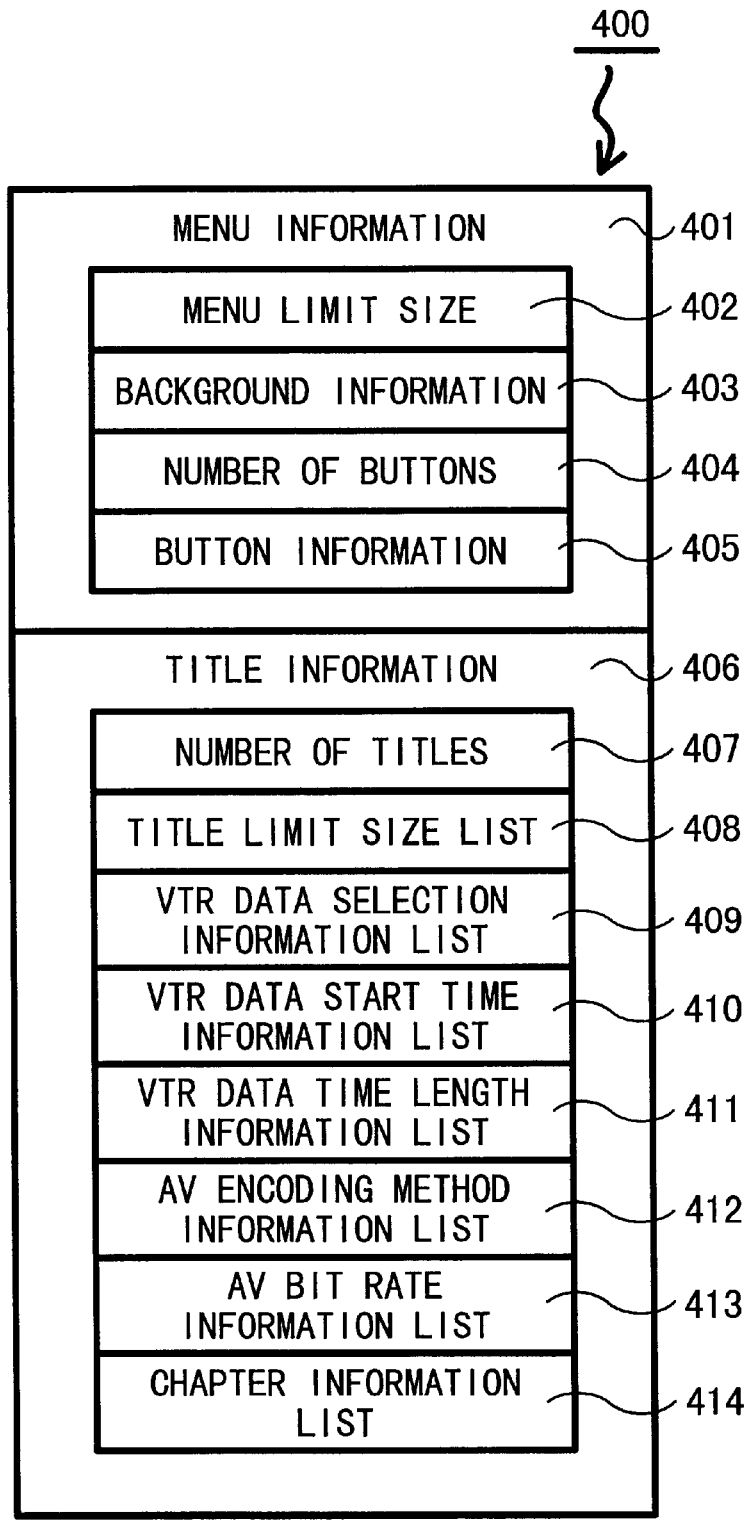
FIG. 4 is a diagram showing a structure of scenario information to be generated in the information generating apparatus of FIG. 1.

FIG. 4 is a schematic diagram showing a part of the scenario information 400, including menu information 401 and title information 406 that is structure information of title. Other information included in the scenario information 400 is a type of the multimedia optical disk, information about authors of the contents to be recorded, or the like. However, detailed explanations for these information are omitted since it is unnecessary for the embodiment.

The menu information 401 includes limit size information for menu 402, background information 403, information of a number of the buttons 404, and button information 405. The menu information 401 is the information about a menu displayed on a screen, such as a television, at a time of playing the multimedia optical disk, such as the DVD. A desirable title, or the like, can be played back by the title, or the like, being specified by a user according to the menu.

The limit size information for menu 402 includes the information about an upper limit of amount of storage available for data constructing the above-described menu in the recording capacity of the multimedia optical disk. The video and audio data of the title are stored as the video file data 505 as shown in FIG. 12, and are managed by the video file management information 504. The menu also has the similar structure. That is, the video and audio data of the menu are stored as the video file data for menu 505, and are managed by the video file management information for menu 504. Therefore, to construct the menu, areas for recording the video file management information for menu 504 and the video file data for menu 505 is needed. Thus, in the entry form in which the scenario information is entered by the operator of the optical disk, a field in which the upper limit of the size to be allocated to these recording areas is entered is provided, and the CPU 10 generates the limit size information for menu 402 based on the entered information.

The background information 403 includes the information of an image to be displayed as a background at the time of displaying buttons. That is, the menu to be displayed on the television, or the like, is structured such that the buttons with the titles, or the like, are displayed against the background image. The background image is generated in advance using a tool for making the menu, or the like. Then, information for specifying the background image is entered as the scenario information, and then the CPU 10 generates the background information 403 based on the entered information.

The information of the number of the buttons 404 includes information about the number of the buttons to be displayed as the menu. In the video file data for menu 505, the number of the buttons of display data of buttons are stored. The video file management information for menu 504 needs to manage the number of the buttons of the display data of the video file data for menu 505, so that the information of the number of the buttons 404 is used for generating the video file management information for menu 504 and the video file data for menu 505. Thus, the information of the number of the buttons is entered as the scenario information, and the CPU 10 generates the information of the number of the buttons 404 based on the entered information.

The button information 405 includes display information of the buttons on a screen and information about playback controls, such as specifying an operation to be implemented by selecting buttons. For example, the menu management information, which brings the button into correspondence with the PGC information for title 801, is included in the information about the playback control. In the menu management information, for example, a number of the PGC information 801 corresponding to the button is stored as a selected information of the PGC information 801. Then, these information are entered as the scenario information, and the CPU 10 generates the button information 403 based on the entered information.

The menu information 401 is not always necessary as a matter of the standard of the multimedia optical disk, such as the DVD, so that the menu information 401 is not generated when the menu information is not included in the entry form.

The title information 406 includes information of a number of titles 407, a limit size information list for title 408, a VTR data selection information list 409, a VTR data start time information list 410, a VTR data time length information list 411, an AV encoding method information list 412, an AV bit rate list 413, and a chapter information list 414. The AV includes both the video and the audio, so that the AV encoding method includes the encoding method of either video or audio, or both.

The information of the number of the titles 407 includes the number of the titles, that is, the number of continuous playback AV data to be recorded on the multimedia optical disk. The number of the titles can be at liberty to set by an operator. The number is entered as the scenario information, and the CPU 10 generates the information of the number of the title 407 based on the entered information.

The limit size information list for title 408, which includes maximum size information of the substantive data, includes an upper limit of amount of storage available for data constructing each title in the recording capacity of the multimedia optical disk. That is, a group of source materials of the video or audio data for constructing one title shown in FIG. 5 is stored in the area in the video file data 505, and the information for managing the video file data 505 is recorded in the area in the video file management information 504, so that the areas for recording the video file management information 504 and video file data 505 are needed for constructing the title. Therefore, in the entry form in which the scenario information is entered by the author, the field in which the upper limit of the size to be allocated to the recording area is provided. The CPU 10 generates the limit size information list for size 408 based on the entered information. The limit size information for title can be set title-by-title and is generated by title-by-title. It is for reason that the limit size information list for title is named as so, instead of limit size information for the title.

The VTR data selection information list 409 that is specification information is the information about the playback AV data of the title and includes the information for specifying an AV source in which video and audio to be encoded are recorded. For example, when the AV sources are stored in a plurality of videotapes, an identification number is given to each videotape so that it becomes possible to specify the AV source by the identification number. Therefore, the identification number is entered as the scenario information, and the CPU 10 generates the VTR data selection information 409 based on the entered information. The VTR data selection information are listed title-by-title.

The VTR data start time information list 410 and the VTR data time length list 411 that are specification information and time break information, are the information for specifying the encoding of the randomly chosen point of the AV source. For example, when the point where ten minutes advanced from the beginning of the videotape specified by the identification information, is determined as a starting point and the point where thirty minutes advanced from the beginning of the videotape is determined as an ending point, ten minutes is entered in the start time information and twenty minutes is entered in the time length information. As the scenario information, the time of the starting point and the time length are entered, and the CPU 10 generates the VTR data start time information list 410 and the VTR data time length list 411 based on the entered information. The VTR data start time information are listed title-by-title.

Further, the VTR data time length information list 411 are listed title-by-title. The VTR data time length information list 411 contains equal information to the playback time of the VTR data of one title, and is also information of playback time length of the substantive data.

The AV encoding method information list 412 that is encoding information is the information for specifying the AV encoding method. For example, the encoding method information for the video includes an aspect ratio, a frame rate, or the like. The encoding method for the audio includes a sampling frequency, or the like. This information can be freely set by the operator. This information is entered as the scenario information, and the CPU 10 generates the AV encoding method information list based on the entered information. The AV encoding method information is also listed title-by-title.

The AV bit rate list 413 that is other encoding information is the information for specifying the bit rate at a time of encoding the AV according to the MPEG2 or the AC-3 standard. This information can be freely set by the operator. This information is entered as the scenario information, and the CPU 10 generates the AV bit rate list 413 based on the entered information. The AV bit rate information is also listed title-by-title.

The chapter information list 414 is the information for dividing the title into arbitrary playback sections so that they are dealt as chapters and includes a time information of the dividing points. This information can be freely set by the operator. The time information of the dividing points is entered as the scenario information, and the CPU 10 generates the chapter information list 414 based on the entered information. The chapter information is also listed title-by-title.

First, the CPU 10 generates the disk information file 502 based on the scenario template. As shown in FIG. 12, the disk information file 502 forms the recording information 501 of the optical disk with the video file 503, and includes the information of the whole optical disk, such as the volume information, the total number of the titles, the total number of the chapters, the type of the optical disk, the author of the recorded information, and a country code. Further, the disk information file 502 also includes the menu information 401.

A generating process of the disk information file 502 is performed by a playback control information generating device 31 that is a global management information control device shown in FIG. 3. The playback control information generating device 31 functions by the execution of the playback control information generating program 21, shown in FIG. 2, by the CPU 10. Hereinafter, the generating process of the disk information file 502 will be described in detail.

Figure 9:
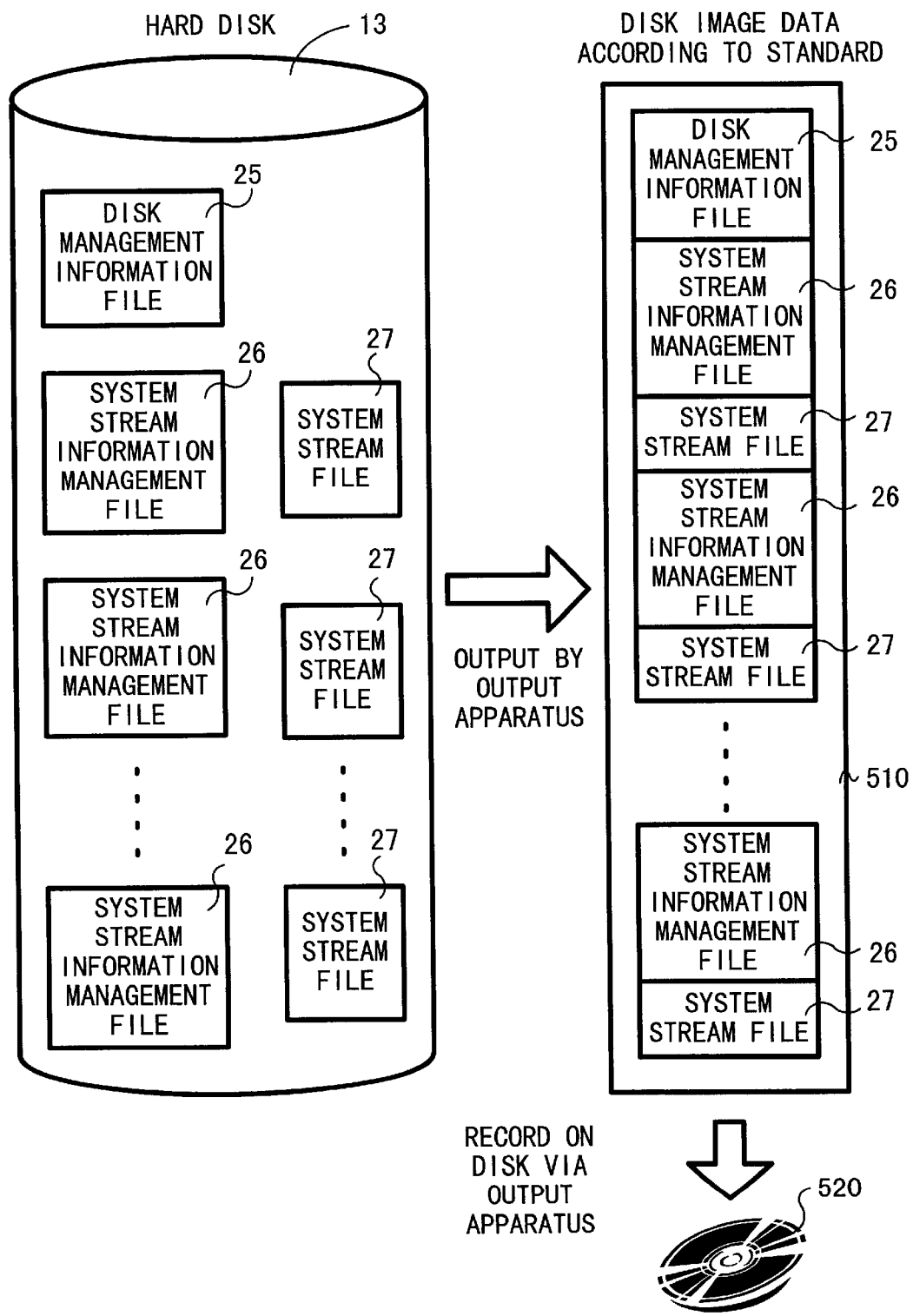
FIG. 9 is a schematic diagram explaining the disk image output process of flowchart of FIG. 8.

First, the CPU 10 reads the information of the number of the titles 407 and the chapter information list 414 included in the title information 406 of the scenario information 400 stored in the RAM 12 or the hard disk 13, and stores the structure of the playback AV data that is the whole optical disk, as data. For example, the CPU 10 stores the disk information file 502 including the total number of the titles and the chapters on a disk management information storage device 32, shown in FIG. 3, as the data. In the embodiment, the disk management information storage device 32 functions as a storage area on the hard disk 13. As shown in FIG. 2 or 9, the disk information file 502 is stored on the hard disk 13 as a disk management information file 25.

Next, the CPU 10 reads the background information 403, the information of the number of the buttons 404, the button information 405 included in the menu information 401 of the scenario information 400 stored in the RAM 12 or the hard disk 13. Then, while the CPU 10 reads the image specified by the background information 403 from the hard disk 13, the CPU 10 reads the display information included in the button information 405, and superimposes the display information of the button image over the image specified by the background information 403. Further, the menu data is structured so that any point in any title can be played back at the flick of the button, by corresponding the button with the title from the information about the playback control of the button information 405. Then, the CPU 10 writes the superimposed background information and the display information of the buttons, and the menu data as the disk management information file 25. However, as described above, the menu is not always necessary as a matter of the standard of the multimedia optical disk, such as the DVD, so that the menu data is not generated when the menu information 401 is not included in the scenario information.

As described above, the disk information file 502 is brought to completion and is stored on the hard disk 13 as the disk management information file 25, as shown in FIG. 2 or 9.

The video file management information 504 is the information for managing the video file data 505, and as shown in FIG. 12, the video file data 503 is constructed of these information. As described above, the video file management information 504 includes the information, such as the size or the recording point of the system stream to be recorded in the video file 503. Therefore, the video file management information 504 cannot be brought to completion until after the system stream is brought to completion.

However, in the embodiment, the video file management information 504 is started generating using the information found at the time of the disk information file 502 is generated.

This is a preparation process for generating the video file management information 504, shown as S3 in FIG. 5. This preparation process is executed by the playback control information generating device 31. That is, the playback control information generating device 31 also functions as a substantive data management information control device. Not only the program for generating the disk management information but also a preparation program for generating the video file management information is included in the playback control information generating program 21 installed on the hard disk 13, shown in FIG. 2.

The playback control information generating device 31 functions by the execution of the playback control information generating program 21, by the CPU 10, as described above. Hereinafter, the preparation process for generating the video file management information 504 will be described with reference to a flowchart in FIG. 6.

First, the CPU 10 reads the AV encoding method information list 411 included in the title information 406 of the scenario information 400 stored in the RAM 12 or the hard disk 13, and writes a parameter about the method for encoding data constructing the system stream in the video file management table 506, shown in FIG. 12, based on the AV encoding method information list 411 (S10). Next, the CPU 10 writes a pointer to the PGC information table for title 508 in the title management information 507, and prepares for recording the PGC information 801 shown in FIG. 15 (S11). The PGC information 810 is set by dividing the chapters into playback sections called the cells, based on the information of the dividing points included in the chapter information list 414 of the scenario information 400. However, a recording point of the data on the system stream in the time information of the dividing points cannot be settled until the encoding process is completed. Therefore, at this stage, the PGC information, as shown in FIG. 15, cannot be brought to completion. Also, the video file management information 504 cannot be brought to completion until after encoding of the system stream is completed.

Further, the CPU 10 reads the information of the number of the titles 407 included in the scenario information 400, and repeats the generating process of the video file management table 506 and the recording preparation process of the title management information 507 until after these processes are performed on the all titles (S12).

As described above, of the video file management information 504, the information, which is found before the video file data 505 is generated, is generated, and the information is stored in a system stream management information storage device 38.

In the embodiment, the system stream management information storage device 38 functions as a storage area on the hard disk 13. The video file management information 504 is stored on the hard disk 13 as a system stream management information file 26, as shown in FIG. 2 or 9.

Further, in the embodiment, a control device 40 switches the system stream management information storage devices 38 title-by-title. The control device 40 functions by the execution of the control program 23 installed on the hard disk 13 shown in FIG. 2, by the CPU 10. By the execution of the control program 23, the CPU 10 reads the title information 406 from the scenario information 400, switches the system stream management information files 26 on the hard disk title-by-title, and stores the video file management information 504 in the respective system stream management file 26.

So far, the information, except for the cell playback time 810, the offset 811 to the cell data, and the number of the logical blocks occupied by the cell shown in FIG. 15, included in the video file management information 504, is generated.

The video file data 505 is constructed of the cells 1001 that are the system streams, and is generated by encoding and multiplexing the moving picture information (video) 1002 and the audio information (audio) 1003. Further, by generating the video file data 505, the information, such as the data recording point on the system stream in the time information of the dividing points, is generated. Therefore, a multiplexing device 37 generates the rest of the video file management information 504 that cannot be written in the preparation process of generating the video file management information at S3 in FIG. 5.

The generating process of the video file data 505 is performed by a video data input device 33, a video data encoding device 34, an audio data input device 35, an audio data encoding device 36, the multiplexing device 37, and the control device 40 shown in FIG. 3. These devices functions by the execution of the multiplexing program 22 and the control program 23 installed on the hard disk 13 shown in FIG. 2, by the CPU 10.

Figure 7A:
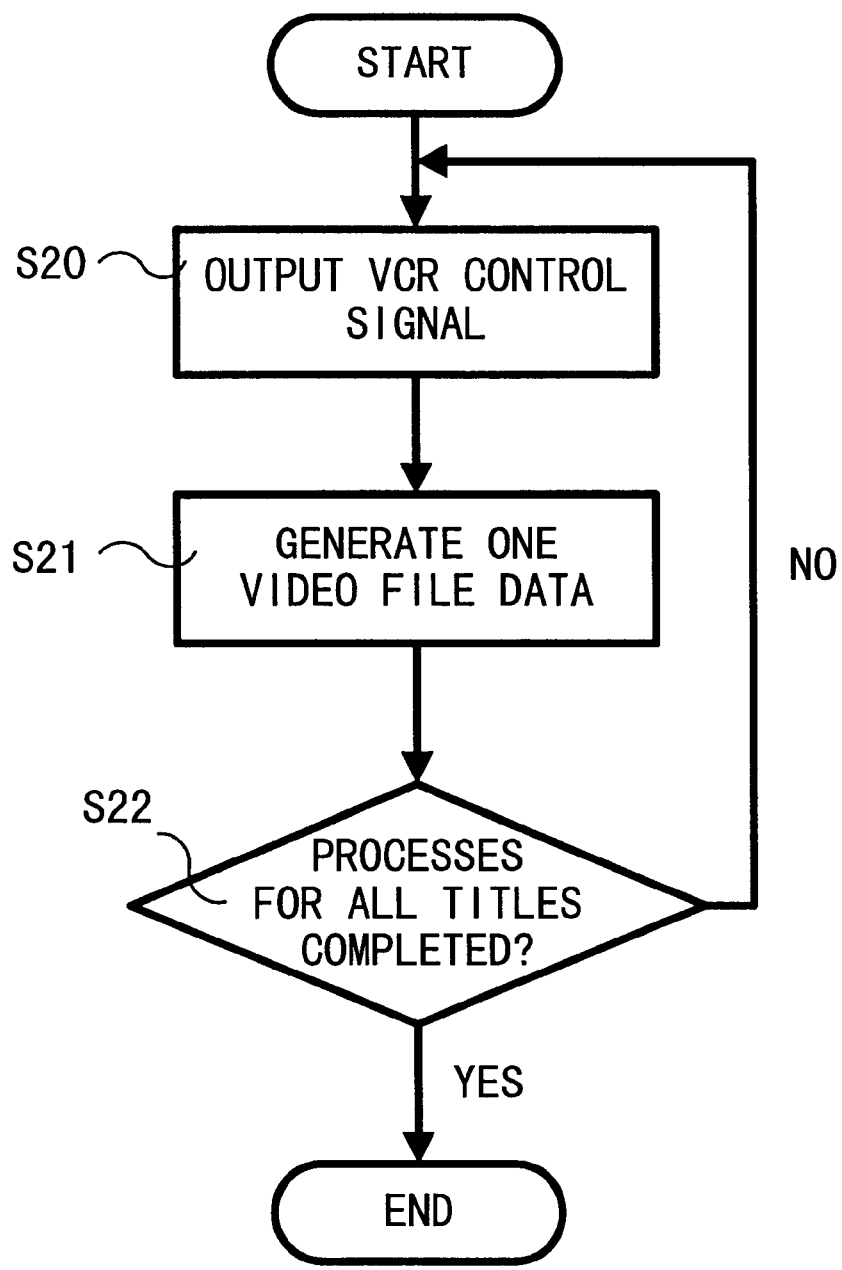
FIG. 7A is a flowchart showing a video file generating process of the flowchart of FIG. 5 in detail.
Figure 7B:
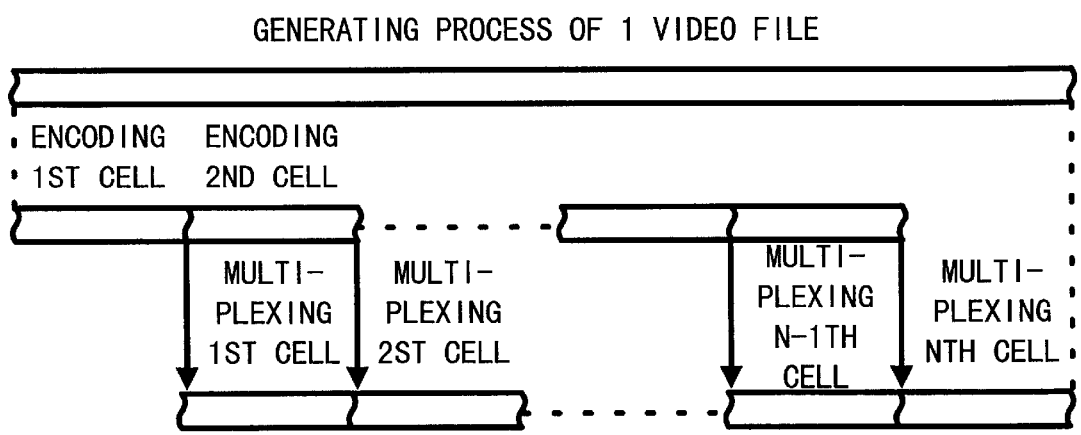
FIG. 7B is a timing diagram showing the generating process of one video file.

Hereinafter, a generating process of the video file and a generating process of the video file management information will be described with reference to a flowchart in FIG. 7A and timing charts in FIGS. 7B and 7C.

First, the control device 40 outputs a control signal to the VCR 5 (S20). The control device 40 functions by the execution of the control program 23 by the CPU 10. In particular, the CPU 10 reads the VTR data start time information list 410 and the VTR data time length information list 411 included in the title information 406 of the scenario information 400 stored in the RAM 12 or the hard disk 13, and outputs these information to the VCR 5 via the serial interface 15, as the control signal. Further, the CPU 10 reads the VTR data selection information list 409 included in the title information 406 and outputs the control signal for performing a playback action based on the VTR data selection information list 409, to the VCR 5 via the serial interface 15. Thus, a video signal or an audio signal of a predetermined position and length is output from the VCR 5.

When a plurality of VCRs 5 are provided, before the aforementioned control signals is output, a control signal that selects the VCR 5 capable of playing the selected AV source is output to the VCR 5 via the serial interface 15. When one VCR 5 is provided, a confirmation whether a videotape is inserted into the VCR 5 may be performed via the serial interface 15 before the output of the control signal. The operator can confirm whether the videotape has recorded the selected AV source thereof by such displaying identification information of the videotape included in the VTR data selection information 409, on the display 2. Further, a barcode label, which shows the identification information, may be adhered to the videotape and read by a barcode reader connected to the main unit 1.

Next, the video data input device 33 or the audio data input device 35 that both are a substantive data input device input the predetermined position and length of the video data, which is the video data, or the audio data, which is the audio data, output from the VCR 5. Then, the video data encoding device 34 or the audio data encoding device 36 that both are an encoding device compress and encodes the video or audio data. After compressing and encoding the video or audio data, the multiplexing device 37 that is a substantive data control device generates the system stream and the video file management information 504. The system stream and the video file management information 504 are stored in the system stream storage device 39 and the system stream management information storage device 38, respectively (S21). As is the case with the system stream management information storage device 38, the system stream storage devices 39 are provided title-by-title. The control device 40 switches the system stream storage devices 39 according to the titles, based on the title information 406 in the scenario information input by the scenario information input device 30.

The video data input device 33, the audio data input device 35, the video data encoding device 34, the audio data encoding device 36 and the multiplexing device 37 function by the execution of the multiplexing program 22 installed on the hard disk 13 shown in FIG. 2, by the CPU 10.

Further, the system stream storage devices 39 function as storage areas on the hard disk 13. The video file data 505 constructed of the system streams is stored on the hard disk 13 as the system stream file 27.

Furthermore, the control device 40 that switches the system stream storage devices 39 according to the title, functions by the execution of the control program 23 installed on the hard disk 13 shown in FIG. 2, using the CPU 10.

More particularly, the CPU 10 inputs the video signal output from the VCR 5 to the MPEG2 encoder 16 having an input interface, and inputs the audio signal output from the VCR 5 to the AC-3 encoder 17 having an input interface. Then, the CPU 10 reads the AV encoding method information list 412 and the AV bit rate information 413 included in the title information 406. Based on these information, the CPU 10 sets a condition specifying the encoding method and the bit rate of the encoding for the MPEG2 encoder 16 and the AC-3 encoder 17, and executes the encoding under the condition. When there is the title limit size information list 408 in the title information 406, a size of the system stream after encoding is calculated by multiplying the required time in the VTR data time length information list 411 of the title information 406 by the bit rate, before encoding. As a result, when the size of the system stream exceeds the limit size of the title limit size information list 408, the bit rate is set by dividing the obtained size of the system stream after encoding by the calculation by the time required in the title limit size information list 408 so that the system stream is within the limit size. Then, encoding is started. Without setting the bit rate in advance, the encoding may be stopped when the encoded system stream reaches the limit size so that the size of the system stream dose not exceed the value required in the title limit size information list 408.

When encoding is started, the CPU 10 arranges the encoded video or audio data at appropriate intervals so that the video and audio data can be synchronously played back, and generates the system streams as shown in FIG. 17. Further, every time the system stream that is an aggregation of GOP that is a completed minimum playback unit is brought to completion, the CPU 10 writes the data to the cell playback time 810, the offset 811 to the cell data, which is a data position on the system stream, and the number of the logical blocks occupied by the cell, which is a data length on the system stream shown in FIG. 15, as the PGC information 801 of the video file management information 503. By doing so, the video file data 505 constructed of the generated system streams is stored on the hard disk 13 title-by-title as the system stream file 27, as shown in FIG. 2 or 9. Further, the video file management information 504 that rest of the information is generated as described above is stored on the hard disk 13 title-by-title as the system stream management information file 26, as shown in FIG. 2 or 9. By doing so, the generating process of one video file data 505 is completed.

Then, the CPU 10 repeats a process of generating the system streams and the video file management information 504 the times of the number of the titles (S22). When the number of the titles of times of the process is completed, the process is completed.

In the embodiment, the encoding and multiplexing as described above are concurrently performed. For example, as shown in FIG. 7B, as the encoding of the first cell is completed and the encoding of the second cell is started, the multiplexing of the first cell is started as the encoding of the first cell is started. After that, similarly, the encoding of nth cell and multiplexing of n–1th cell are concurrently performed. Therefore, the time involved in the generating process of the system streams can be extremely reduced as compared with the conventional generating method.

Figure 7C:
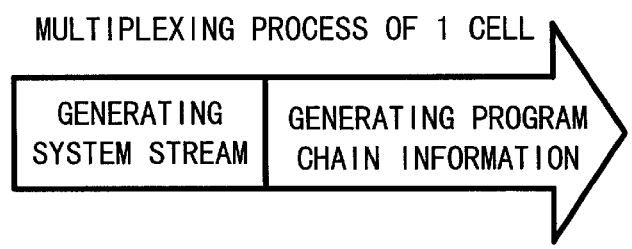
FIG. 7C is a timing diagram showing a multiplexing process of one cell.

Further, as shown FIG. 7C, the multiplexing process of one cell is constructed of the generating process of the system stream and the generating process of the PGC information 801 shown in FIG. 15. When the generating process of one system stream is finished, the CPU 10 immediately writes the data to the cell playback time 810 included in the PGC information 801, the offset 811 to the cell data, and the number of the logical blocks occupied by the cell. That is, the PGC information 801 is brought to completion every time the system stream corresponding one cell is generated. Therefore, the time involved in the generating process of the PGC information 801 can be extremely reduced as compared with the conventional process that the PGC information 801 is generated after all system streams are generated.

Finally, an output device 41 outputs the information that is stored in the disk management information storage device 32, the system stream management information storage devices 38, and the system stream storage devices 39 as the disk management information 25, the system stream management file 26, and the system stream file 27, respectively, in the order of data according to the standard of the multimedia optical disk, such as the DVD, and generates data that are arranged in the same order as data to be actually recorded on the multimedia optical disk, that is, a disk image.

The output device 41 functions by the execution of the output program 24 installed on the hard disk 13 shown in FIG. 2, by the CPU 10. Hereinafter, a process of generating the disk image will be described with reference to a flowchart in FIG. 8.

In the standard of the multimedia optical disk, as shown in FIG. 12, the recording order on the multimedia optical disk is determined as the disk information file 502, the video file management information 504, and the video file data 505. When a plurality of titles will be recorded on a multimedia optical disk, it is determined that a pair of the video file management information 504 and the video file data 505 continues the number of the titles.

Therefore, the CPU 10 reads the disk information file 502 stored on the hard disk 13 as the disk information file 25 and outputs the disk information file 502 to a disk image area 510 on the hard disk 13 shown in FIG. 9 (S30). Next, the CPU 10 reads the video file management information 504 stored in the system stream management information file 26 and the video file data 505 constructed of the system streams stored in the system stream file 27 in this order, and outputs them to the disk image area 510 on the hard disk 13 (S31 and S32). When a plurality of the titles will be recorded on a multimedia optical disk, the CPU 10 determines whether these processes are performed the number of the all titles (S33). When the all processes are not completed, the CPU 10 returns to the step of outputting the video file management information 504 and repeats the process until the video file management information 504 and the video file data 505 of all titles are output. Then, the CPU 10 outputs the data as sequential data.

As a result, in the disk image area 510 on the hard disk 13, disk image data that is arranged in the same order as the data to be actually recorded on the multimedia optical disk 520 is generated.

By using such the disk image data, before actually recording the data on the multimedia optical disk 520, the AV data can be simulated on the information generating apparatus and it is easy to make changes to the AV data.

The CPU 10 outputs the aforementioned disk image to the optical disk recording apparatus 6 via the SCSI interface 14, allows the optical disk recording apparatus 6 to record the data on the multimedia optical disk, and brings the multimedia optical disk to completion. As described above, the information generating apparatus of the embodiment is provided with the optical disk recording apparatus 6 as a recording device, therefore, it functions as an information recording apparatus.

Data may be temporary recorded on a different recording medium from the multimedia optical disk, such as the digital linear tape, using the digital tape recording apparatus (not shown). Then, the data may be transferred to and recorded on the multimedia optical disk, such as the DVD, by undergoing a pressing operation or the like using the digital linear tape.

As described above, in the embodiment, files that are individual storage areas are prepared for data by data which the size cannot be found until after encoding is completed, and each data individually in the files are continuously output as the sequential data. Therefore, the generating process of each data can be concurrently performed with encoding, so that data to be recorded on a multimedia optical disk, such as the DVD, can be speedily generated.

As opposed to this, in the conventional apparatus, first, video or audio data is encoded based on the scenario information and stored on a first hard disk. Then, the system stream is brought to completion on a second hard disk by multiplexing the data encoded on the first hard disk. Finally, based on the scenario information and the information that is found from the generated system stream, a disk image that the video file management information and the disk management information are added thereon, is generated on a third hard disk.

As described above, the conventional making method of the multimedia optical disk is extremely complicated and requires much time. However, the information generating apparatus of the embodiment can speedily and efficiently make the multimedia optical disk, so that the information generating apparatus can produce outstanding effects as compared with the conventional apparatus.

Figure 10:
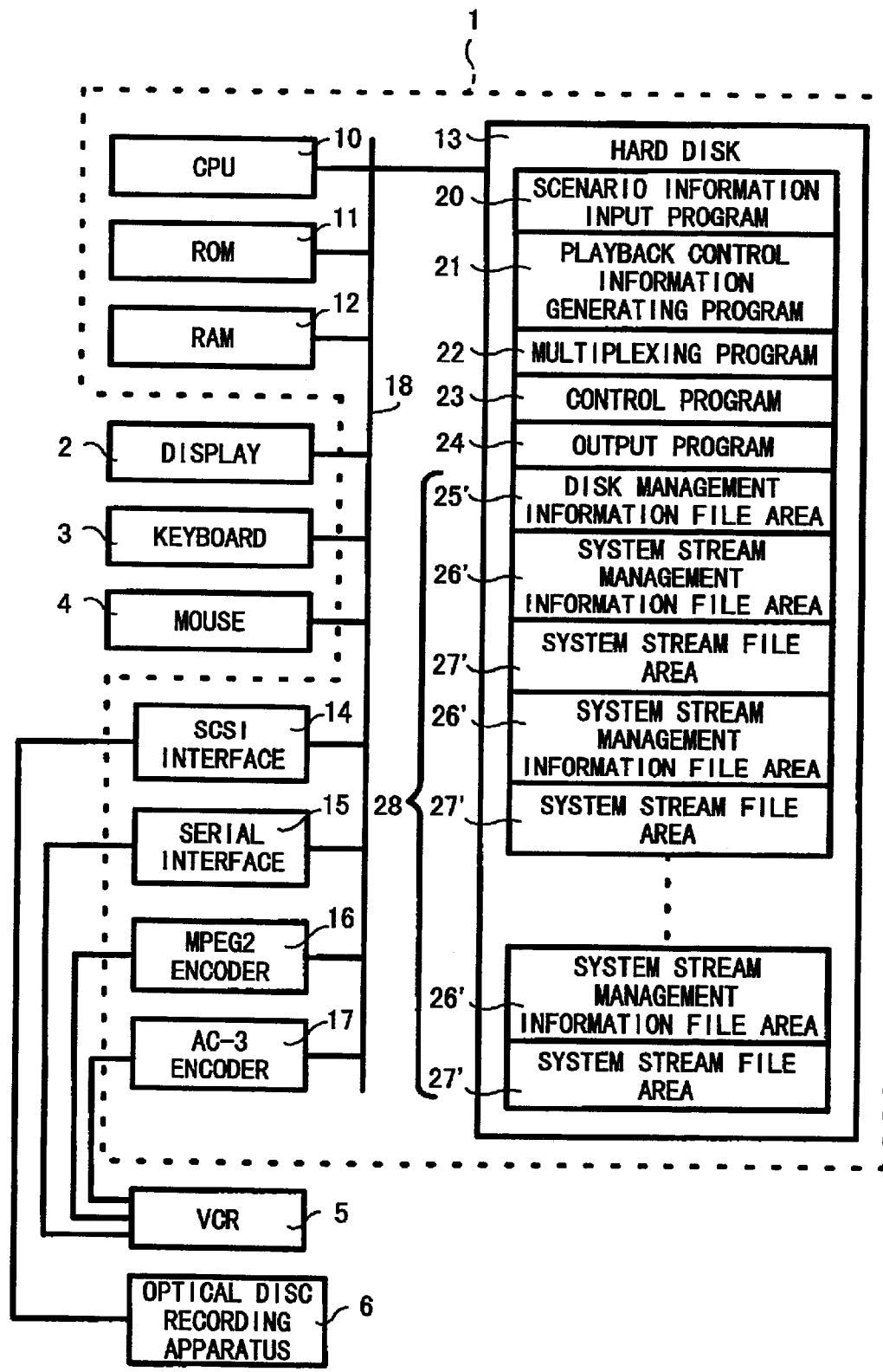
FIG. 10 is a block diagram showing a general structure of an information generating apparatus of a second embodiment of the invention.

Next, a second embodiment of the invention will be described with reference to FIGS. 10 and 11. Elements that are common to the first and the second embodiments are given the same symbols and the explanations for those elements are omitted.

The information generating apparatus of the second embodiment has one image data storage file of the multimedia optical file for storing output data. The information generating apparatus of the second embodiment does not have a plurality of storage files, as the information generating apparatus of the first embodiment has such on disk information file 25, on system stream management information file 26, and on system stream file 27. It is the different point from the first embodiment. The structures of the information generating apparatuses of the first embodiment and the second embodiment are identical except for the storage area on the hard disk 13, as shown in FIG. 10.

It is difficult to accurately obtain the data size of the video file data 505 constructed of the disk information file 502, the video file management information 504, and the system streams until after encoding is completed. It is also difficult to accurately obtain a position of these information to be recorded on the image data to be finally output to record on the multimedia optical disk.

However, it is possible to make a rough estimate using the scenario information 400.

Therefore, in the embodiment, a position of the information to be recorded is estimated roughly using the scenario information 400. The generating process of each data is made possible to be concurrently performed with encoding by constructing and arranging the data on the image data storage file, according to the estimated data size. By doing so, the data to be recorded on the multimedia optical disk, such as the DVD, is speedily generated.

First, the CPU 10 that is a management information storage area allocating device sets a condition so that the size of the disk management information 502 becomes maximum size, and makes a trial calculation based on the menu information 401 in the scenario information 400, the number of the titles in the title information 406, and the chapter information 414. Further, the CPU 10 sets a condition so that the size of the system stream management information 504 becomes maximum size, and makes a trial calculation based on the number of the titles 407, the VTR data time length information list 411, and the chapter information 414.

Figure 11:
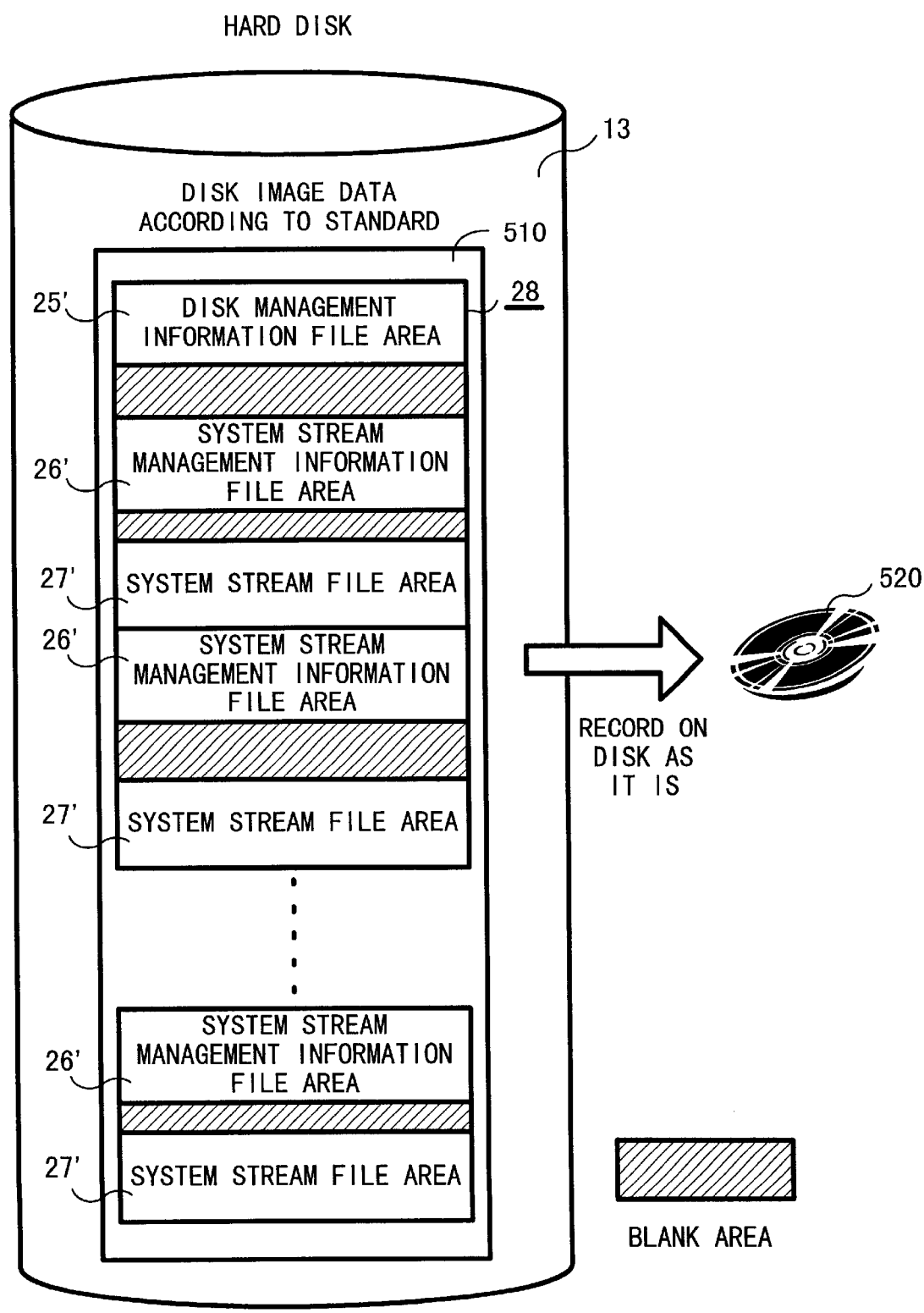
FIG. 11 is a schematic diagram explaining a disk image output process in the second embodiment.

Then, as shown in FIG. 11, the CPU 10 allocates a disk management information file area 25' for storing the disk information file 502 and a system stream management information file area 26' for storing the video file management information 504 on an image data storage file 28, on the hard disk 13. The data sizes of the disk management information 502 and the video file management information 504 are extremely small as compared with that of the system stream. Except for special cases, the data size, which will occupy the storage capacity of the multimedia optical disk, such as the DVD, is one ten-thousandth. Therefore, even when each file area is allocated with the maximum data size, the size of the file area has little effect on the amount of AV data available on the optical disk.

Next, the CPU 10 that is an information amount calculation device and a substantive data storage area allocating device calculates the sum of each time length of VTR data to be recorded as the title, in the VTR data time length information list 411, subtracts the allocated amount for the disk management information 502 and the video file management information 504 from a storage capacity of the whole optical disk. Then, the bit rate that is the data amount per unit time is calculated by dividing the result of the subtraction by the total time length.

The maximum data size of the system steam of each title is calculated by multiplying the time length of each title by the calculated bit rate. Then, the CPU 10 allocates a system stream file area 27', which is the storage area of the maximum data size, in the image data storage file 28 on the hard disk 13.

By doing so, one image data storage file 28 is formed on the hard disk 13. In the image data storage file 28, as shown in FIG. 10 or 11, the storage areas, such as the disk management information file area 25', the system stream management information file area 26' for the first title, the system stream file area 27' for the first title, the system stream management information file area 26' for the second title, the system stream file area 27' for the second title, are allocated as the rough estimated data size. Therefore, the information generating apparatus performs the process, which is described above using the flowchart in FIGS. 5 to 8, on each storage area. When encoding is completed, the disk management information 502, the system stream management information file 504, and the system stream file 505 are stored in each storage area on the image data storage file. At the time of encoding, the calculated bit rate is used for encoding so that the data size of the system stream becomes within the storage area of the system stream. However, the bit rate in the AV bit rate information list 413 of the scenario information 400 may be used for encoding and the encoding may be stopped when the data size of the encoded system stream reaches the size of the storage area.

In the embodiment, when actual data does not reach the size of the allocated storage area which is roughly estimated, there is a blank of data, which is indicated with oblique lines shown in FIG. 11, between the allocated storage areas on the image data storage file 28. However, such a blank is filled with data showing blank specified in the standard of the multimedia optical disk, such as the DVD.

By doing so, the generating process of each data can be concurrently performed with encoding. Therefore, data to be recorded on the multimedia optical disk, such as the DVD, can be speedily generated. The output device 41 reads the data stored on the image data storage file 28 and outputs the data.

The data output as described above is recorded on the multimedia optical disk 520, such as the DVD, using a disk recording apparatus, or the data is temporary recorded on a different recording medium from the multimedia optical disk, such as the digital linear tape, using the digital tape recording apparatus. Then, the data may be transferred to and recorded on the multimedia optical disk, such as the DVD, by undergoing a pressing operation or the like using the digital linear tape. Finally, the multimedia optical disk 520 that conforms to the scenario information is completed.

The information generating apparatus of the second embodiment has an advantage that the disk image data can be used for recording the multimedia optical disk as it is, though there is a case where the blanks exist on the disk image data in the structure of the embodiment.

It would be understood that the invention is not restricted to the DVD. However, the invention can be applied to multimedia optical disks of every description. Further, the invention can be applied to not only an authoring apparatus, but also a multimedia optical disk recording-playback apparatus intended for the home, for example.

What is claimed is:

1. An information generating method for generating substantive data representing one of video data or audio data, substantive data management information for managing the substantive data according to a format of an information recording medium per title or a plurality of titles, and global management information for managing the whole information recording medium on a storage medium other than the information recording medium, the method comprising the steps of:

inputting scenario information for performing management per title;

inputting the substantive data specified by specifying information in structure information of the title included in the scenario information;

encoding the input substantive data according to encoding information in the structure information;

storing the encoded substantive data in a storage area of the storage device;

generating an amount of the substantive data which is encoded to predetermined breakpoints of each step according to encoding and storing or index information about a storing point in the storage area, every breakpoint, and storing the information in the storage area as a part of the substantive data management information;

generating information other than the index information of the substantive data management information concurrently with each step based on the structure information and storing the information in the storage area;

generating the global management information concurrently with each step based on the scenario information and storing the information in the storage area; and outputting all information in the order according to the format of the information recording medium after all necessary information for the substantive data, the substantive data management information, and the global management information are stored.

2. The information generating method according to claim 1, wherein the step of inputting the scenario information inputs the scenario information including maximum size information of the substantive data of each title, and the step of recording the encoded substantive data in the recording area stores the substantive data whose part that exceeds the maximum size is omitted based on the maximum size information.

3. The information generating method according to claim 1, wherein the step of inputting the substantive data inputs a part of the substantive data corresponding to time break information that is the specifying information, and the steps according to encoding and storing the substantive data encodes and stores a part of the substantive data corresponding to the time break information.

4. An information recording method of recording the information, which is generated and output by the information generating method of claim 1, on the information recording medium, further comprising the steps of:

converting the information output by the step of outputting to a form according to the format of the information recording medium; and modulating a light beam based on the information which is converted to the form by the step of converting and recording the information on the information recording medium.

5. An information generating method for generating substantive data representing one of video data or audio data, substantive data management information for managing the substantive data according to a format of an information recording medium per title or a plurality of titles, and global management information for managing the whole information recording medium on a storage medium other than the information recording medium, the method comprising the steps of:

inputting scenario information for performing management per title;

allocating storage areas of each information in the order according to the format of the information recording medium so that sizes of the substantive data management information and the global management information are maximum on the storage device, based on structure information of the title in the scenario information;

calculating an amount of information per unit time at the time of playing by dividing a result of subtraction that the size of the storage area after allocation is subtracted from a total size of storage area of the information recording medium by a total playback time length of the substantive data of each title which is obtained from the structure information;

allocating a recording area of the substantive data after encoding per title in the order according to the format of the information recording medium, based on a maximum amount of the information by calculating the maximum amount of the information of the substantive data after encoding per title by multiplying the amount of the information per unit time by the playback time length of each title;

inputting the substantive data specified by specifying information in the structure information;

encoding the input substantive data based on encoding information in the structure information;

storing the encoded substantive data in the storage area;

generating an amount of the substantive data which is encoded to predetermined breakpoints of each step according to encoding and storing or index information about a storing point in the storage area, every breakpoints, and storing the information in the storage area as a part of the substantive data management information;

generating information other than the index information of the substantive management information concurrently with each step based on the structure information and storing the information in the storage area;

generating the global management information concurrently with each step based on the scenario information and storing the information in the storage area; and outputting all information from top of the storage area after all necessary information for the substantive data, the substantive data management information, and the global management information are stored.

6. The information generating method according to claim 5, wherein the step of inputting the substantive data inputs a part of the substantive data corresponding to time break information that is the specifying information, and the steps according to encoding and storing the substantive data encodes and stores a part of the substantive data corresponding to the time break information.

7. An information recording method of recording the information, which is generated and output by the information generating method of claim 5, on the information recording medium, further comprising the steps of:

converting the information output by the step of outputting to a form according to the format of the information recording medium; and modulating a light beam based on the information which is converted to the form by the step of converting and recording the information on the information recording medium.

8. An information generating apparatus having a storage device thereof for generating substantive data representing one of video data or audio data, substantive data management information for managing the substantive data according to a format of an information recording medium per title or a plurality of titles, and global management information for managing the whole information recording medium on the storage medium other than the information recording medium, comprising:

a scenario information input device that inputs scenario information for performing management per title;

a substantive data input device that inputs the substantive data specified by specifying information in structure information of the title included in the scenario information;

an encoding device that encodes the input substantive data according to encoding information in the structure information;

a substantive data control device that stores the encoded substantive data in a storage area of the storage device;

a substantive data management information control device that generates an amount of the substantive data which is encoded to predetermined breakpoints in the encoding process performed by the encoding device and the storing process performed by the substantive data control device or index information about a storing point in the storage area every breakpoints and stores the information in the storage area as a part of the substantive data management information, the substantive data management information control device concurrently generating information other than the index information of the substantive data management information with the storing process of the index information based on the structure information and storing the information in the storage area;

a global management information control device that concurrently generates the global management information with the processes performed by the substantive data control device and the substantive data management information control device based on the scenario information and stores the information in the storage area; and an output device that outputs the substantive data, the substantive data management information, and the global management information, which are recorded in the storage areas, in the order according to the format of the information recording medium after all necessary information for each information are stored.

9. The information generating apparatus according to claim 8, wherein the scenario information input device inputs the scenario information including maximum size information of the substantive data of each title, and the substantive data control device stores the substantive data whose part that exceeds the maximum size is omitted based on the maximum size information.

10. The information generating apparatus according to claim 8, wherein the substantive data input device inputs a part of the substantive data corresponding to time break information that is the specifying information, the encoding device encodes a part of the substantive data corresponding to the time break information, and the substantive data control device stores the part of the substantive data corresponding to the time break information in the storage area.

11. An information recording apparatus for recording the information, which is generated and output by the information generating method of claim 8, on the information generating apparatus, further comprising:

a conversion device that converts the information output at the step of outputting to a form according to the format of the information recording medium; and a recording device that modulates a light beam based on the information which is converted to the form by the conversion device and reads the information on the information recording medium.

12. An information generating apparatus having a storage device for generating substantive data representing one of video data or audio data, substantive data management information for managing the substantive data according to a format of an information recording medium per title or a plurality of titles, and global management information for managing the whole information recording medium on a storage medium other than the information recording medium, comprising:

a scenario information input device that inputs scenario information for performing management per title;

a management information recording area allocating device that allocates storage areas of each information in the order according to the format of the information recording medium so that sizes of the substantive data management information and the global management information are maximum on the storage device, based on structure information of the title in the scenario information;

an information amount calculation device that calculates an amount of information per unit time at the time of playing by dividing a result of subtraction that the size of the storage area after allocation is subtracted from a total size of storage area of the information recording medium by a total playback time length of the substantive data of each title which is obtained from the structure information;

a substantive data recording area allocating device that allocates a storage area of the substantive data after encoding per title in the order according to the format of the information recording medium, based on a maximum amount of the information by calculating the maximum amount of the information of the substantive data after encoding per title by multiplying the amount of the information per unit time by the playback time length of each title;

a substantive data input device that inputs the substantive data specified by specifying information in the structure information;

an encoding device that encodes the input substantive data based on encoding information in the structure information;

a substantive data control device that records the encoded substantive data in the recording area;

a substantive data management information control device that generates an amount of the substantive data which is encoded to predetermined breakpoints in the encoding process performed by the encoding device and the storing process performed by the substantive data control device or index information about a storing point in the storage area every breakpoints and stores the information in the storage area as a part of the substantive data management information, the substantive data management information control device concurrently generating information other than the index information of the substantive management information with the recording process of the index information based on the structure information and storing the information in the storage area;

a global management information control device that concurrently generates the global management information with the processes performed by the substantive data control device and the substantive data management information control device based on the scenario information and stores the information in the storage area; and an output device that outputs the substantive data, the substantive data management information, and the global management information, which are stored in the storage areas, from top of the recording area after all necessary information for each information are stored.

13. The information generating apparatus according to claim 12, wherein the substantive data input device inputs a part of the substantive data corresponding to time break information that is the specifying information, the encoding device encodes a part of the substantive data corresponding to the time break information, and the substantive data control device stores the part of the substantive data corresponding to the time break information in the storage area.

14. An information recording apparatus for recording the information, which is generated and output by the information generating apparatus of claim 12, on the information recording medium, further comprising:

a conversion device that converts the information output by the output device to a form according to the format of the information recording medium; and a recording device that modulates a light beam based on the information which is converted to the form by the conversion device and records the information on the information recording medium.

15. A computer readable information recording medium storing an information generating program thereof to generate substantive data representing one of video data or audio data, substantive data management information for managing the substantive data according to a format of an information recording medium per title or a plurality of titles, and global management information for managing the whole information recording medium on a storage medium of a computer, the program comprising:

a program for inputting scenario information for performing management per title;

a program for inputting the substantive data specified by specifying information in structure information of the title included in the scenario information;

a program for encoding the input substantive data according to encoding information in the structure information;

a program for storing the encoded substantive data in a storage area of the storage device;

a program for generating an amount of the substantive data which is encoded to predetermined breakpoints of each program according to encoding and storing or index information about a storing point in the storage area every breakpoints and storing the information in the storage area as a part of the substantive data management information;

a program for generating information other than the index information of the substantive management information concurrently with each program based on the structure information and storing the information in the storage area;

a program for generating the global management information concurrently with each program based on the scenario information and storing the information in the storage area; and a program for outputting all information in the order according to the format of the information recording medium after all necessary information for the substantive data, the substantive data management information, and the global management information are stored.

16. The information recording medium according to claim 15, wherein the program for inputting the scenario information to the computer inputs the scenario information including maximum size information of the substantive data of each title, and the program for recording the encoded substantive data in the recording area stores the substantive data whose part that exceeds the maximum size is omitted based on the maximum size information.

17. The information recording medium according to claim 15, wherein the program for inputting the substantive data to the computer inputs a part of the substantive data corresponding to time break information that is the specifying information, and the program according to encoding and storing the substantive data encodes and stores a part of the substantive data corresponding to the time break information.

18. The information recording medium according to claim 15, the program further comprising:

a program for converting the information output by the information generating program to a form according to the format of the information recording medium; and a program for modulating a light beam based on the information which is converted to the form by the program for converting and recording the information on the information recording medium.

19. A computer readable information recording medium storing an information generating program thereof to generate substantive data representing one of video data or audio data, substantive data management information for managing the substantive data according to a format of an information recording medium per title or a plurality of titles, and global management information for managing the whole information recording medium on a storage medium of a computer, the program comprising:

a program for inputting scenario information for performing management per title to the computer;

a program for allocating storage areas of each information in the order according to the format of the information recording medium so that sizes of the substantive data management information and the global management information are maximum on the storage device, based on structure information of the title in the scenario information;

a program for calculating an amount of information per unit time at the time of playing by dividing a result of subtraction that the size of the storage area after allocation is subtracted from a total size of recording area of the information recording medium by a total playback time length of the substantive data of each title which is obtained from the structure information;

a program for allocating a storage area of the substantive data after encoding per title in the order according to the format of the information recording medium, based on a maximum amount of the information by calculating the maximum amount of the information of the substantive data after encoding per title by multiplying the amount of the information per unit time by the playback time length of each title;

a program for inputting the substantive data specified by specifying information in the structure information;

a program for encoding the input substantive data based on encoding information in the structure information;

a program for storing the encoded substantive data in the storage area;

a program for generating an amount of the substantive data which is encoded to predetermined breakpoints of each program according to encoding and storing or index information about a storing point in the recording area every breakpoints and storing the information in the storage area as a part of the substantive data management information;

a program for generating information other than the index information of the substantive management information concurrently with each program based on the structure information and storing the information in the storage area;

a program for generating the global management information concurrently with each program based on the scenario information and storing the information in the storage area; and a program for outputting all information from top of the storage area after all necessary information for the substantive data, the substantive data management information, and the global management information are stored.

20. The information recording medium according to claim 19, wherein the program for inputting the substantive data to the computer inputs a part of the substantive data corresponding to time break information that is the specifying information, and the programs according to encoding and storing the substantive data encodes and stores a part of the substantive data corresponding to the time break information.

21. The information recording medium according to claim 19, the program further comprising:

a program for converting the information which is generated and output by the information generating program to a form according to the format of the information recording medium; and a program for modulating a light beam based on the information, which is converted to the form by the program for converting, and recording the information on the information recording medium.

* * * * *